(12) United States Patent
Johnson et al.

(10) Patent No.: US 10,073,453 B2
(45) Date of Patent: Sep. 11, 2018

(54) AUTOPILOT AUTORELEASE SYSTEMS AND METHODS

(71) Applicant: FLIR Systems, Inc., Wilsonville, OR (US)

(72) Inventors: Mark Johnson, Vannes (FR); Christopher Yeomans, Fareham (GB)

(73) Assignee: FLIR Systems, Inc., Wilsonville, OR (US)

( * ) Notice: Subject to any disclaimer, the term of this patent is extended or adjusted under 35 U.S.C. 154(b) by 18 days.

(21) Appl. No.: 15/391,682

(22) Filed: Dec. 27, 2016

(65) Prior Publication Data
US 2017/0108868 A1    Apr. 20, 2017

Related U.S. Application Data

(63) Continuation-in-part of application No. 15/239,760, filed on Aug. 17, 2016, which is a continuation of (Continued)

(51) Int. Cl.
*G05D 1/00* (2006.01)
*G05D 1/02* (2006.01)
(Continued)

(52) U.S. Cl.
CPC .......... *G05D 1/0088* (2013.01); *B63H 25/04* (2013.01); *B63H 25/38* (2013.01); *B64C 19/00* (2013.01);
(Continued)

(58) Field of Classification Search
CPC .. G05D 1/0088; G05D 1/0202; G05D 1/0206; B63H 25/04; B63H 25/38; B64C 19/00
See application file for complete search history.

(56) References Cited

U.S. PATENT DOCUMENTS 2,968,957 A    1/1961    Condie et al.
3,301,510 A    1/1967    Cook
(Continued)

FOREIGN PATENT DOCUMENTS

CN    102 692 225    9/2012
CN    103 149 948    6/2013
(Continued)

OTHER PUBLICATIONS

Gorovyi et al., "A Novel Trajectory Restoration Algorithm for High-Resolution SAR Imaging", Jun. 16-18, 2014, 4 pages, Radar Symposium (IRS), 2014 15th International, Gdansk, Poland.
(Continued)

*Primary Examiner* — Khoi H Tran
*Assistant Examiner* — Robert T Nguyen
(74) *Attorney, Agent, or Firm* — Haynes and Boone, LLP

(57) ABSTRACT

Techniques are disclosed for systems and methods to provide accurate, low lag, and reliable autopilot autorelease in a hydraulic steering system for mobile structures. A hydraulic steering system includes a logic device configured to communicate with an autopilot pump controller, a control surface reference sensor, an orientation sensor, and/or a gyroscope. Control and sensor signals provided by the pump controller and/or the various sensors are used to selectively enable and/or disable an autopilot release signal. The autopilot release signal enables or disables the autopilot pump controller and/or an autopilot pump, or controls the autopilot pump controller to enable or disable the autopilot pump.

19 Claims, 28 Drawing Sheets

Related U.S. Application Data application No. PCT/US2015/015281, filed on Feb. 10, 2015, application No. 15/391,682, which is a continuation-in-part of application No. 15/222,905, filed on Jul. 28, 2016, which is a continuation of application No. PCT/US2015/013141, filed on Jan. 27, 2015, application No. 15/391,682, which is a continuation-in-part of application No. PCT/US2015/068342, filed on Dec. 31, 2015, and a continuation-in-part of application No. PCT/US2015/067959, filed on Dec. 29, 2015.

(60) Provisional application No. 62/272,013, filed on Dec. 28, 2015, provisional application No. 61/942,517, filed on Feb. 20, 2014, provisional application No. 61/934,678, filed on Jan. 31, 2014, provisional application No. 62/099,016, filed on Dec. 31, 2014, provisional application No. 62/099,032, filed on Dec. 31, 2014, provisional application No. 62/099,022, filed on Dec. 31, 2014.

(51) Int. Cl.
*B63H 25/04* (2006.01)
*B63H 25/38* (2006.01)
*B64C 19/00* (2006.01)

(52) U.S. Cl.
CPC ......... *G05D 1/0202* (2013.01); *G05D 1/0206* (2013.01)

(56) References Cited

U.S. PATENT DOCUMENTS

| | | |
|---|---|---|
| 3,436,531 A | 4/1969 | Throckmorton |
| 3,488,954 A | 1/1970 | Thomas et al. |
| 5,523,951 A | 6/1996 | Kriesgman et al. |
| 6,311,634 B1 | 11/2001 | Ford et al. |
| 6,450,112 B1 | 9/2002 | Deghuee |
| 7,469,168 B1 | 12/2008 | Richey |
| 8,275,544 B1 | 9/2012 | Wells et al. |
| 2003/0149528 A1 | 8/2003 | Lin |
| 2004/0181322 A1* | 9/2004 | Okuyama .............. B63H 25/04 701/21 |
| 2005/0080495 A1* | 4/2005 | Tessier ................... B64C 13/04 700/63 |
| 2006/0278152 A1* | 12/2006 | Nickerson .............. B63H 25/14 114/144 R |
| 2007/0178779 A1* | 8/2007 | Takada ................... B63H 5/125 440/61 S |
| 2011/0307128 A1 | 12/2011 | Igarashi et al. |
| 2012/0130570 A1 | 5/2012 | Pease |
| 2012/0132120 A1 | 5/2012 | Gai et al. |
| 2012/0277933 A1* | 11/2012 | Krogh .................. G05D 1/0061 701/11 |
| 2013/0173096 A1 | 7/2013 | Chalhoub et al. |
| 2014/0316657 A1 | 10/2014 | Johnson et al. |
| 2016/0231743 A1* | 8/2016 | Bendewald ....... B60W 50/0097 |

FOREIGN PATENT DOCUMENTS

| | | |
|---|---|---|
| DE | 198 03 078 | 7/1999 |
| DE | 198 07 525 | 9/1999 |
| EP | 0434363 | 6/1991 |
| GB | 1 223 986 | 3/1971 |
| GB | 1 419 244 | 12/1975 |
| GB | 2 429 541 | 2/2007 |
| JP | 2013 086745 | 5/2013 |
| WO | WO 2014/168674 | 10/2014 |

OTHER PUBLICATIONS

Gierusz et al., "Multivariable Robust Steering of the Ship With Feedforward Controller", ScienceDirect, IFAC Proceedings Volumes, 2007, pp. 310-314, vol. 40, Issue 17, Elsevier, Amsterdam, Netherlands.

* cited by examiner

AUTOPILOT AUTORELEASE SYSTEMS AND METHODS

CROSS-REFERENCE TO RELATED APPLICATIONS

This application claims the benefit of and priority to U.S. Provisional Patent Application No. 62/272,013 filed Dec. 28, 2015 and entitled "AUTOPILOT AUTORELEASE SYSTEMS AND METHODS," which is incorporated herein by reference in its entirety.

This application is a continuation-in-part of U.S. patent application Ser. No. 15/239,760 filed Aug. 17, 2016 and entitled "ACCELERATION CORRECTED ATTITUDE ESTIMATION SYSTEMS AND METHODS" which is a continuation of International Application No. PCT/US2015/015281 filed Feb. 10, 2015 and entitled "ACCELERATION CORRECTED ATTITUDE ESTIMATION SYSTEMS AND METHODS", which claims priority to and the benefit of U.S. Provisional Patent Application No. 61/942,517 filed Feb. 20, 2014 and entitled "ACCELERATION CORRECTED ATTITUDE ESTIMATION SYSTEMS AND METHODS", all of which are hereby incorporated herein by reference in their entirety.

This application is also a continuation-in-part of U.S. patent application Ser. No. 15/222,905 filed Jul. 28, 2016 and entitled "HYDRAULIC SLIP COMPENSATION SYSTEMS AND METHODS" which is a continuation of International Application No. PCT/US2015/013141 filed Jan. 27, 2015 and entitled "HYDRAULIC SLIP COMPENSATION SYSTEMS AND METHODS", which claims priority to and the benefit of U.S. Provisional Patent Application No. 61/934,678 filed Jan. 31, 2014 and entitled "HYDRAULIC SLIP COMPENSATION SYSTEMS AND METHODS", all of which are hereby incorporated herein by reference in their entirety.

This application is a continuation-in-part of International Patent Application No. PCT/US2015/068342 filed Dec. 31, 2015 and entitled "ADAPTIVE AUTOPILOT CONTROL SYSTEMS AND METHODS" which claims priority to and the benefit of U.S. Provisional Patent Application No. 62/099,016 filed Dec. 31, 2014 and entitled "ADAPTIVE TRACK KEEPING SYSTEMS AND METHODS", U.S. Provisional Patent Application No. 62/099,032 filed Dec. 31, 2014 and entitled "PROACTIVE DIRECTIONAL CONTROL SYSTEMS AND METHODS", and U.S. Provisional Patent Application No. 62/099,022 filed Dec. 31, 2014 and entitled "STABILIZED DIRECTIONAL CONTROL SYSTEMS AND METHODS", all of which are hereby incorporated herein by reference in their entirety.

This application is a continuation-in-part of International Patent Application No. PCT/US2015/067959 filed Dec. 29, 2015 and entitled "PROACTIVE DIRECTIONAL CONTROL SYSTEMS AND METHODS" which claims priority to and the benefit of U.S. Provisional Patent Application No. 62/099,016 filed Dec. 31, 2014 and entitled "ADAPTIVE TRACK KEEPING SYSTEMS AND METHODS", U.S. Provisional Patent Application No. 62/099,032 filed Dec. 31, 2014 and entitled "PROACTIVE DIRECTIONAL CONTROL SYSTEMS AND METHODS", and U.S. Provisional Patent Application No. 62/099,022 filed Dec. 31, 2014 and entitled "STABILIZED DIRECTIONAL CONTROL SYSTEMS AND METHODS", all of which are hereby incorporated herein by reference in their entirety.

TECHNICAL FIELD

One or more embodiments of the invention relate generally to an autopilot control and more particularly, for example, to systems and methods for disabling a hydraulically actuated autopilot for mobile structures.

BACKGROUND

Hydraulically actuated steering systems typically include a yoke or helm pump that actuates a steering cylinder used to change the position of a corresponding control surface, such as a rudder or actuated propulsion system on a ship or various control surfaces on an airplane. Conventional autopilot installations for hydraulic steering systems include a motorized autopilot pump and a reference transducer or sensor coupled to the steering cylinder and/or steering control surface to provide steering angle/position feedback to the autopilot controller.

Most conventional autopilots are enabled and disabled through manipulation of a keypad containing "auto" and "standby" buttons, where a user must manually disable the autopilot before being able to steer the corresponding vehicle without being fought by the autopilot. Other types of conventional autopilots require a user to overpower the autopilot before the autopilot disengages, but this technique is typically unavailable in hydraulic steering systems because the helm pump cannot easily overpower the autopilot pump when they are coupled in parallel, as is typical with hydraulic steering systems with integrated hydraulically actuated autopilots. Moreover, any substantial delay (e.g., to find and push a "standby" button and/or to spin a helm faster than an autopilot can pump against) risks collision with an object in the path of the mobile structure. Thus, there is a need for an improved methodology to provide expedient, accurate, and reliable release of an hydraulically actuated autopilot for a mobile structure.

SUMMARY

Techniques are disclosed for systems and methods to provide accurate, low lag, and reliable autopilot release in a hydraulic steering system for mobile structures. In one embodiment, a hydraulic steering system may include a logic device configured to communicate with an autopilot pump controller, a control surface reference sensor, an orientation sensor, and/or a gyroscope. Control and sensor signals provided by the pump controller and/or the various sensors may be used to selectively enable and/or disable an autopilot release signal. The autopilot release signal may be configured to enable or disable the autopilot pump controller and/or an autopilot pump, or control the autopilot pump controller to enable or disable the autopilot pump.

In various embodiments, a system may include a logic device configured to configured to receive one or more sensor and/or control signals and provide an autopilot release signal for a hydraulic steering system coupled to a mobile structure. In some embodiments, the logic device may be adapted to receive control surface angles and autopilot control surface demands corresponding to a control surface for the mobile structure that is actuated by the hydraulic steering system; and selectively enable the autopilot release signal based, at least in part, on the control surface angles and/or the autopilot control surface demands.

In some embodiments, a method may include receiving control surface angles and autopilot control surface demands corresponding to a control surface for a mobile structure that is actuated by a hydraulic steering system; and selectively enabling the autopilot release signal based, at least in part, on the control surface angles and/or the autopilot control surface demands. In some embodiments, the method may include determining a control surface speed from the control surface angles; determining an autopilot control surface rate from the autopilot control surface demands; and selectively enabling the autopilot release signal based, at least in part, on the control surface speed and the autopilot control surface rate.

In some embodiments, a system may include a logic device configured to receive one or more sensor and/or control signals and provide an autopilot release signal for a hydraulic steering system coupled to a mobile structure. The logic device may be configured to initiate an autorelease observation cycle based, at least in part, on control surface angles and autopilot control surface demands corresponding to a control surface for the mobile structure that is actuated by the hydraulic steering system; and selectively enable the autopilot release signal during the autorelease observation cycle based, at least in part, on the control surface angles and/or the autopilot control surface demands corresponding to the initiated autorelease observation cycle.

In some embodiments, a method may include initiating an autorelease observation cycle based, at least in part, on control surface angles and autopilot control surface demands corresponding to a control surface for mobile structure that is actuated by a hydraulic steering system coupled to the mobile structure; and selectively enabling the autopilot release signal during the autorelease observation cycle based, at least in part, on the control surface angles and/or the autopilot control surface demands corresponding to the initiated autorelease observation cycle.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
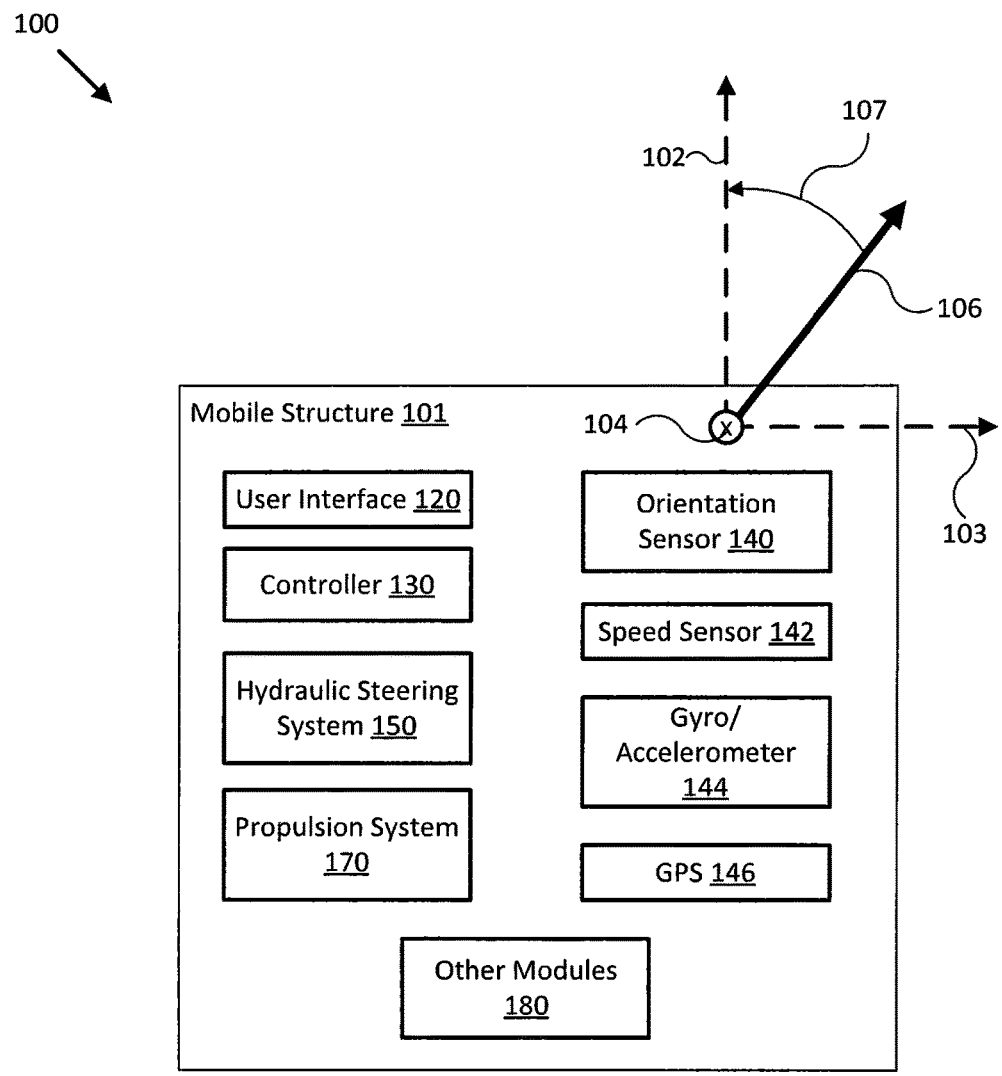
FIG. 1 illustrates a block diagram of a hydraulic steering system in accordance with an embodiment of the disclosure.

In accordance with various embodiments of the present disclosure, hydraulic steering systems and methods may advantageously be configured to generate an autopilot autorelease signal to deactivate the autopilot automatically without requiring additional helm sensors. Such systems and methods may include an autopilot/hydraulic pump controller in conjunction with a gyroscope and/or a heading sensor providing measurements of a yaw rate and/or a heading of a mobile structure. For example, the gyroscope and/or heading sensor may be mounted to or within the mobile structure (e.g., an aircraft, watercraft, and/or other steered mobile structure), or may be integrated with the autopilot/hydraulic pump controller. Embodiments of the present disclosure can reliably enable and disable an autopilot autorelease signal using hydraulic pump control signals and, in some embodiments, a yaw rate of the mobile structure. In some embodiments, such systems and methods may be used to enable and/or disable an autopilot autorelease signal without input from a control surface reference transducer/sensor (e.g., a rudder reference transducer).

Often, hydraulically steered mobile structures, such as boats, include a helm station, an autopilot pump, and a hydraulic cylinder (connected to a rudder or outboard engine) that are connected in parallel. Both the helm pump and the autopilot pump may include check valves so they cannot be backdriven. This means that if either or both the helm/pilot pumps run, then the cylinder will respond. Many boats of this type are fitted with a rudder reference sensor which provides the autopilot with precise rudder angle information, and gives user feedback via a rudder angle indicator. In the case where the skipper needs to make a course adjustment, or avoid an obstacle, it is desirable to eliminate the step of having to press standby.

If the skipper attempts to move the helm without entering standby, then the autopilot will run in the direction opposite the manually applied helm because the autopilot will try to regain the original course. This will not create mechanical damage: some of the oil pumped by the skipper through the helm pump will simply be diverted into the autopilot pump rather than reaching the cylinder. However it will hamper the skipper's attempt to avoid an obstacle, and so it is desirable to automatically 'release' the autopilot.

To create the autopilot release signal, a system may first measure the rate of change of rudder angle by differentiation. Optionally a linear filter (e.g., with a 0.5 s time constant) may be applied, along with a deadband filter, to eliminate noise. The same filter and deadband may be applied to an autopilot pump motor speed signal (or drive signal, or a rudder demand, if a speed signal or drive signal is not available). After such processing, there are two resulting signals, the measured rudder speed and the autopilot's intended rudder rate. The autopilot release signal may be asserted if the intended rudder rate is zero and the measured rudder speed is non-zero for more than a predetermined time period (e.g., 0.5 s), or if the mathematical signs of the measured and applied signals are different for more than the predetermined time period, for example.

Once the autopilot release signal is enabled, the intended rudder rate will be zero by definition (e.g., the autopilot will no longer be driving or active). The autopilot release signal may be cleared if the measured rudder speed is zero for more than a period of time (e.g., 2 or 10 seconds, corresponding to an estimated comfortable time lag once the skipper stops applying helm inputs) and/or once the heading has stabilized (e.g., the yaw rate falls below a predetermined threshold, such as 2°/s). Various permutations, thresholds, and time periods are contemplated. In some embodiments, one or more such control loop parameters may be adjusted adaptively to a particular type of mobile structure and/or range of environmental conditions.

In an embodiment of the present disclosure, a reliable virtual rudder estimate may be determined without resorting to a steering actuator/control surface reference transducer/sensor by estimating the hydraulic slip from other sensor and/or control signals and deriving the virtual rudder estimate from the hydraulic slip. A "virtual rudder" or a "virtual rudder estimate," as used herein, is an estimated steering angle/position that may be used by an autopilot or other type of controller of a steering system, for example, to steer a mobile structure according to a desired heading.

FIG. 1 illustrates a block diagram of a system 100 including a hydraulic steering system 150 in accordance with an embodiment of the disclosure. In various embodiments, system 100 may be adapted to receive one or more signals corresponding to control surface angles (e.g., rudder angles), autopilot control surface demands (e.g., rudder demands), and/or corresponding angular velocities (e.g., yaw rates) for mobile structure 101, for example, and selectively enable and/or disable an autopilot release signal based on the one or more signals.

In further embodiments, system 100 may be adapted to detect a hydraulic pump drive signal of hydraulic steering system 150 and/or to measure a yaw rate of mobile structure 101. System 100 may then use these detections/measurements to determine a linear steering actuator speed (e.g., a linear rudder speed) for mobile structure 101 and/or an elasticity estimate for hydraulic steering system 150. System 100 may determine a corrected steering actuator speed from the linear steering actuator speed and/or the elasticity estimate, and then derive a virtual rudder estimate from the corrected steering actuator speed. In various embodiments, system 100 may use the virtual rudder estimate to control hydraulic steering system 150 and steer mobile structure 101 according to a desired heading, such as heading angle 107, for example. In another embodiment, hydraulic steering system may also use rudder reference transducer to provide a rudder reference measurement.

In the embodiment shown in FIG. 1, system 100 may be implemented to provide hydraulically actuated autopilot control for a particular type of mobile structure 101, such as an aerial drone, a watercraft, an airplane, a vehicle, and/or other types of mobile structures. In one embodiment, system 100 may include one or more of a user interface 120, a controller 130, an orientation sensor 140, a speed sensor 142, a gyroscope/accelerometer 144, a global positioning satellite system (GPS) 146, a hydraulic steering system 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope/accelerometer 144). As shown in FIG. 1, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor and be transformed (e.g., using parameters for one or more coordinate frame transformations) to be referenced to an absolute coordinate frame and/or a coordinate frame of mobile structure 101.

User interface 120 may be implemented as a display, a touch screen, a keyboard, a mouse, a joystick, a knob, a steering wheel, a ship's wheel or helm, a yolk, and/or any other device capable of accepting user input and/or providing feedback to a user. In various embodiments, user interface 120 may be adapted to provide user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), determine corrected steering actuator speeds and/or virtual rudder estimates, determine parameters for one or more coordinate frame transformations, and/or perform coordinate frame transformations, for example, or to perform various other processes and/or methods.

In various embodiments, user interface 120 may be adapted to accept user input, for example, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be transmitted to other devices of system 100 over one or more communication links.

In one embodiment, user interface 120 may be adapted to receive a sensor or control signal (e.g., from orientation sensor 140 and/or hydraulic steering system 150) over communication links formed by one or more associated logic devices, for example, and display sensor information corresponding to the received sensor or control signal to a user. In related embodiments, user interface 120 may be adapted to process sensor and/or control signals to determine sensor information. For example, a sensor signal may include a heading, an angular velocity, an acceleration, and/or a position of mobile structure 101. In such embodiment, user interface 120 may be adapted to process the sensor signals to determine sensor information indicating a motion compensated/stabilized linear acceleration, a roll, pitch, and/or yaw (orientation and/or rate), and/or a position of mobile structure 101, for example, and display the sensor information as feedback to a user. In one embodiment, user interface 120 may be adapted to display a time series of various sensor information and/or other parameters as part of or overlaid on a graph or map. For example, user interface 120 may be adapted to display a time series of positions of mobile structure 101 overlaid on a geographical map, which may include one or more graphs indicating a corresponding time series of virtual rudder estimates, pump control signals, and/or other sensor and/or control signals.

In some embodiments, user interface 120 may be adapted to accept user input including a user-defined target heading (e.g., a locked heading) for mobile structure 101, for example, and to generate control signals for hydraulic steering system 150 to cause mobile structure 101 to steer according to the target heading. More generally, user interface 120 may be adapted to display sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of hydraulic steering system 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for steering control (e.g., using hydraulic steering system 150) and/or performing other various operations of mobile structure 101 and/or system 100. In some embodiments, a control loop may include processing sensor signals and/or sensor information in order to control one or more operations of mobile structure 101 and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such a gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, and/or other device capable of measuring a linear speed of mobile structure 101 (e.g., in a surrounding medium and/or aligned with a longitudinal axis of mobile structure 101) and providing such measurements as sensor signals that may be communicated to various devices of system 100.

Gyroscope/accelerometer 144 may be implemented as one or more electronic sextants, semiconductor devices, integrated chips, accelerometer sensors, accelerometer sensor systems, or other devices capable of measuring linear accelerations and/or angular velocities/accelerations (e.g., direction and magnitude) of mobile structure 101 and providing such measurements as sensor signals that may be communicated to other devices of system 100 (e.g., user interface 114, controller 130). Gyroscope/accelerometer 144 may be positioned and/or adapted to make such measurements in relation to a particular coordinate frame of mobile structure 101, for example.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that may be communicated to various devices of system 100. In some embodiments, GPS 146 may be adapted to determine a velocity of mobile structure 101 (e.g., using a time series of position measurements), such as an absolute velocity of mobile structure 101. In various embodiments, one or more logic devices of system 100 may be adapted to determine a speed of mobile structure 101 from such velocity.

Hydraulic steering system 150 may be adapted to physically adjust a heading of mobile structure 101 according to one or more control signals, user inputs, and/or a virtual rudder estimate provided by logic device of system 100, such as controller 130. Hydraulic steering system 150 may include one or more reversing pumps, pump controllers, hydraulic actuators (e.g., steering cylinders), and at least one control surface (e.g., a rudder or other type of steering mechanism) of mobile structure 101 physically coupled to at least one hydraulic actuator. In some embodiments, hydraulic system 150 may be adapted to physically adjust a control surface of mobile structure 101 to a variety of positive and/or negative steering angles/positions. One or more embodiments of hydraulic steering system 150 are illustrated in more detail in FIGS. 2 and 3.

Propulsion system 170 may be implemented as a propeller, turbine, or other thrust-based propulsion system, and/or other types of propulsion systems that can be used to provide motive force to mobile structure 101. In some embodiments, propulsion system 170 may be non-articulated, for example, such that the direction of thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated and coupled to and/or integrated with hydraulic steering system 150, for example, such that the direction of generated thrust is variable relative to a coordinate frame of mobile structure 101, and such that propulsion system 170 forms a control surface or part of a control surface, as described herein. Non-limiting examples of articulated propulsion systems include, for example, an outboard motor for a watercraft, an inboard motor for a watercraft with a variable thrust vector/port (e.g., used to steer the watercraft), or an aircraft propeller or turbine with a variable thrust vector, for example. As noted herein, both articulated and non-articulated propulsion systems can produce an assisting force on a steering actuator of hydraulic steering system 150 that varies with thrust. Propulsion system 170 is illustrated in more detail in FIGS. 2 and 3.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 200 (e.g., controller 130) to provide operational control of mobile structure 101 that compensates for environmental conditions, such as wind speed and/or direction, swell speed, amplitude, and/or direction, and/or an object in a path of mobile structure 101, for example.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing hydraulic steering, for example, or for transmitting and/or receiving communications, such as sensor signals, sensor information, and/or control signals, between one or more devices of system 100. In one embodiment, such method may include instructions to determine reference direction 106, heading 107, and/or a yaw rate of mobile structure 101 from various sensor signals, to determine an elasticity estimate for hydraulic steering system 150, and/or to determine a virtual rudder estimate from the elasticity estimate and one or more sensor and/or control signals, for example, as described herein. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various measurements of magnetic fields and accelerations. For example, orientation sensor 140, gyroscope/accelerometer 144, and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads.

In various embodiments, a logic device of system 100 (e.g., of orientation sensor 140, gyroscope/accelerometer 144, and/or other elements of system 100) may be adapted to determine parameters (e.g., using signals from various devices of system 100) for transforming a coordinate frame of orientation sensor 140 and/or gyroscope/accelerometer 144 to/from a coordinate frame of mobile structure 101, at-rest and/or in-motion, and/or other coordinate frames, as described herein. One or more logic devices of system 100 may be adapted to use such parameters to transform a coordinate frame of gyroscope/accelerometer 144 to/from a coordinate frame of orientation sensor 140 and/or mobile structure 101, for example. Furthermore, such parameters may be used to determine and/or calculate one or more adjustments to an orientation of gyroscope/accelerometer 144 that would be necessary to physically align a coordinate frame of gyroscope/accelerometer 144 with a coordinate frame of orientation sensor 140 and/or mobile structure 101. Adjustments determined from such parameters may be used to selectively power adjustment servos (e.g., of gyroscope/accelerometer 144 and/or other elements of system 100), for example, or may be communicated to a user through user interface 120, as described herein.

Figure 2:
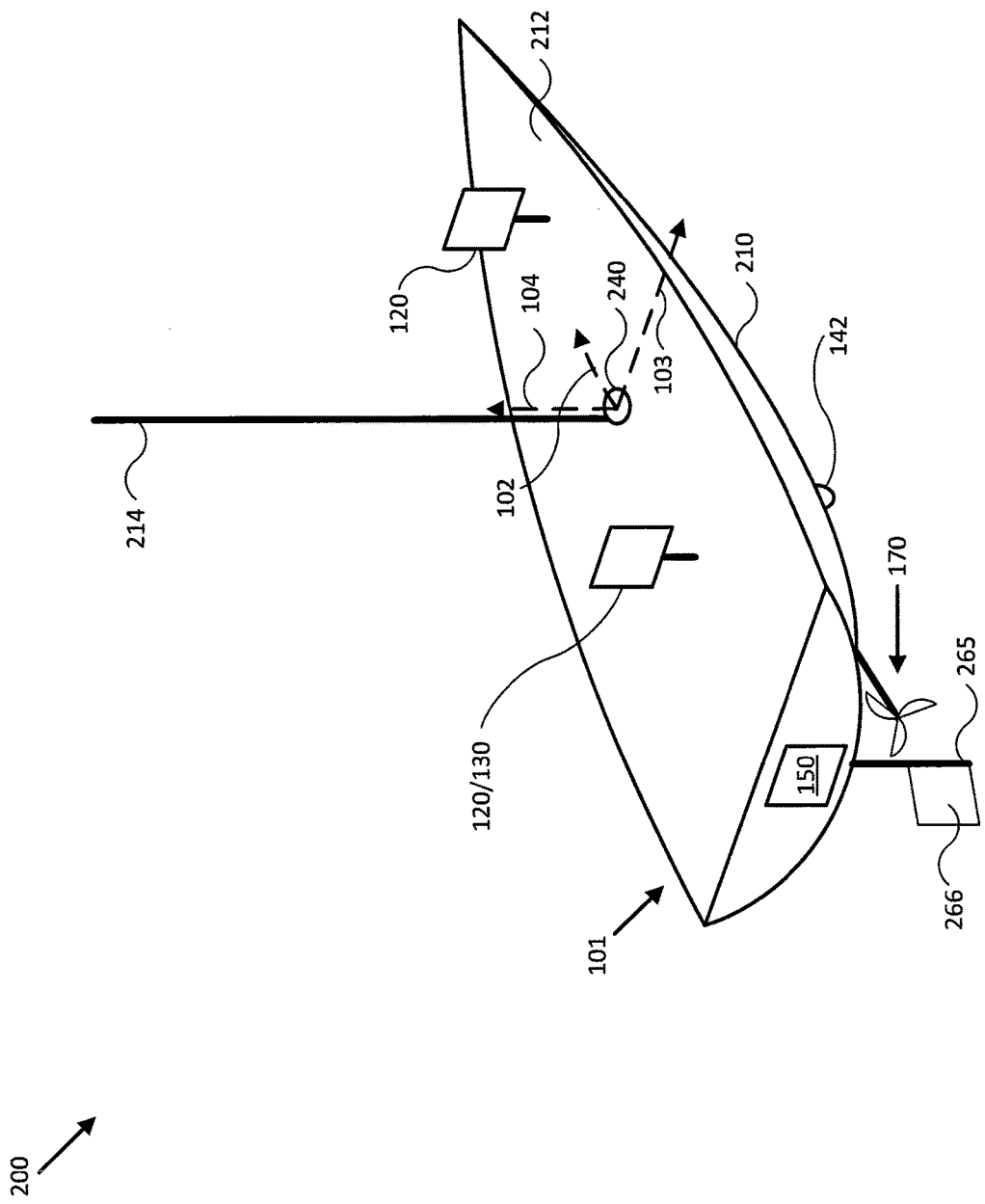
FIG. 2 illustrates a diagram of a hydraulic steering system in accordance with an embodiment of the disclosure.

FIG. 2 illustrates a diagram of a hydraulic steering system 200 in accordance with an embodiment of the disclosure. In the embodiment shown in FIG. 2, system 200 may be implemented to provide hydraulically actuated autopilot control for mobile structure 101, similar to system 100 of FIG. 1. For example, system 200 may include sensor cluster 240 (e.g., orientation sensor 140, gyroscope/accelerometer 144, GPS 146), user interface/controller 120/130, secondary user interface 120, hydraulic steering system 150, and various other sensors and/or actuators. In the embodiment illustrated by FIG. 2, mobile structure 101 is implemented as a motorized boat including a hull 210, a deck 212, a mast/sensor mount 214, a rudder post, a rudder 266, and inboard motor 170. In other embodiments, hull 210, deck 212, mast/sensor mount 214, rudder post 265, rudder 266, and inboard motor 170 may correspond to attributes of a passenger aircraft or other type of vehicle, robot, or drone, for example, such as an undercarriage, a passenger compartment, an engine/engine compartment, a trunk, a roof, a steering mechanism, and/or other portions of a vehicle.

As depicted in FIG. 2, mobile structure 101 includes rudder 266 that is coupled to hydraulic steering system 150 through rudder post 265 and non-articulated inboard motor 170 that is coupled directly to mobile structure 101. If inboard motor 170 produces propeller walk rotating mobile structure 101 counterclockwise (looking down on deck 212), rudder 266 experiences an assisting force from starboard to port such that turns to port are assisted. Counterclockwise rotations result in starboard turns being assisted. If motor 170 was instead mounted to rudder post 265, the propeller walk that produced counterclockwise rotation of mobile structure 101 when inboard would instead produce counterclockwise rotation of rudder post 265 and assist starboard turns. In some embodiments, controller 130 may be configured to determine both the magnitude and direction of an assisting force without user intervention/input (e.g., without knowledge of the type of propulsion system) and/or without a reference transducer/sensor, for example, by executing the various methods described herein.

In one embodiment, user interfaces 120 may be mounted to mobile structure 101 substantially on deck 212 and/or mast/sensor mount 214. Such mounts may be fixed, for example, or may include gimbals and other leveling mechanisms so that a display of user interfaces 120 stays substantially level with respect to a horizon and/or a "down" vector. In another embodiment, at least one of user interfaces 120 may be located in proximity to mobile structure 101 and be mobile throughout a user level (e.g., deck 212) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 2, in some embodiments, speed sensor 142 may be mounted to a portion of mobile structure 101 substantially below a typical user level, such as to hull 210, and be adapted to measure a relative water speed. Speed sensor 142 may be adapted to provide a thin profile to reduce and/or avoid water drag. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 210.

In the embodiment illustrated by FIG. 2, mobile structure 101 includes direction/longitudinal axis 102, direction/lateral axis 103, and direction/vertical axis 104 meeting approximately at mast/sensor mount 214 (e.g., near a center of gravity of mobile structure 101). In one embodiment, the various axes may define a coordinate frame of mobile structure 101 and/or sensor cluster 240. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 200 and/or mobile structure 101. Each element of system 200 may be located at positions different from those depicted in FIG. 2. Each device of system 200 may include one or more batteries or other electrical power storage devices, for example, and may include one or more solar cells or other electrical power generating devices. In some embodiments, one or more of the devices may be powered by a power source for mobile structure 101. As noted herein, each element of system 200 may be implemented with an antenna, a logic device, and/or other analog and/or digital components enabling that element to provide, receive, and process sensor signals and interface or communicate with one or more devices of system 200. Further, a logic device of that element may be adapted to perform any of the methods described herein.

Figure 3:
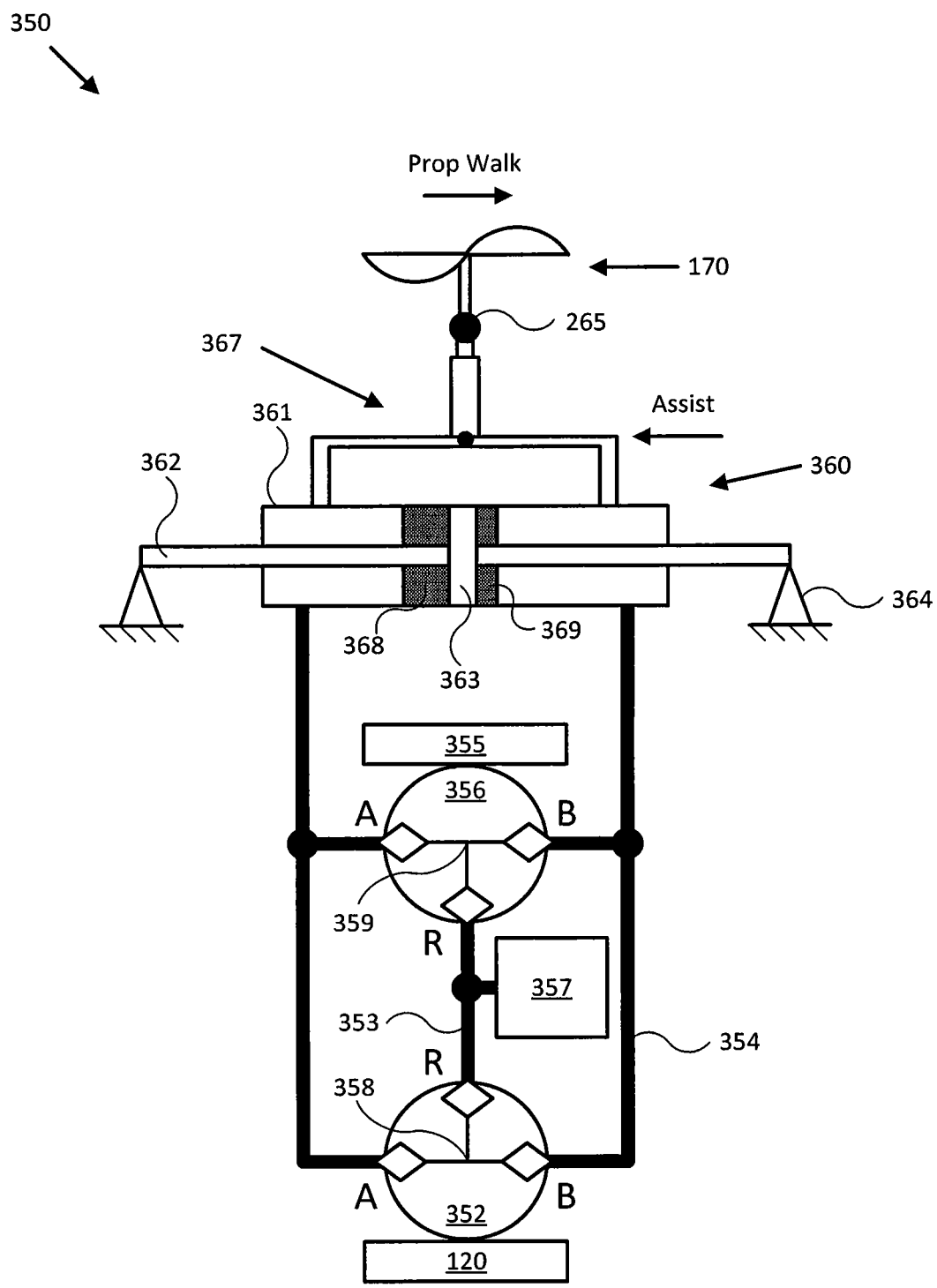
FIG. 3 illustrates a diagram of a hydraulic steering system in accordance with an embodiment of the disclosure.

FIG. 3 illustrates a diagram of hydraulic steering system 350 in accordance with an embodiment of the disclosure. In the embodiment shown in FIG. 3, system 350 may be implemented to provide hydraulically actuated autopilot control for a mobile structure, similar to system 150 of FIGS. 1 and 2. For example, system 350 may include user interface or helm 120 coupled to and controlling helm pump 352, pump controller 355 coupled to autopilot pump 356, and steering actuator/cylinder 360 coupled to helm pump 352 and autopilot pump 356 through supply lines 354. Helm 120 may be configured to operate helm pump 352 according to user input (e.g., manually turning a steering wheel or helm), for example, and pump controller 355 may be configured to operate autopilot pump 356 according to pump control signals (e.g., provided by controller 130 of FIG. 1).

Steering cylinder 360 may be coupled to articulated propulsion system 170 through tiller assembly 367 and rudder post 265, such that motion of cylinder body 361 from right to left on the page results in propulsion system 170 rotating clockwise.

As shown in FIG. 3, steering actuator 360 is implemented as a balanced hydraulic actuator, where cylinder rod 362 extends all the way through cylinder body 361 and there is no volume or area imbalance when pumping fluid into either end of cylinder body 361. In other embodiments, steering actuator 360 may be implemented as an unbalanced hydraulic actuator, where cylinder rod 362 extends from sliding seal 363 through only one end of cylinder body 361. Also shown are anchors 364, which may be configured to anchor cylinder rod 362, provide firm actuation through movement of cylinder body 361, and/or act as port and starboard end stops limiting motion of cylinder body 361 and steering actuator 360, thereby limiting motion of propulsion system 170.

Although a particular configuration of steering actuator, tiller assembly, and control surface are depicted in FIG. 3, system 350 may be implemented with a variety of different configurations and/or combinations of configurations, including where propulsion system 170 is replaced with a rudder, for example, or cylinder body 361 is anchored and cylinder rod 362 is coupled to rudder post 265. Also, in some embodiments, additional helm and/or other pumps may be coupled in parallel to system 350 without substantially altering operation of system 350.

Pumps 352 and 356 may be implemented as conventional manual and/or motorized hydraulic pumps with respective check valve assemblies 358 and 359 that allow the pumps to be refilled from the low pressure side and/or reservoir 357 when pumping fluid out of the high pressure side, but do not allow fluid to enter or exit a pump unless the pump is actively pumping and creating a sufficient pressure differential. Thus, pumps 352 and 356 are functionally decoupled from each other and do not force each other to rotate when only one pump is operated.

Pump controller 355 may be implemented as one or more power switching circuits (e.g., power transistors, relays, and/or other power switching circuits), motor sensors, and/or logic devices that can operate autopilot pump 356 according to various pump control signals (e.g., pulse width modulations or PWMs) indicating a target motor speed, direction, and duration, that can sense a supply voltage, a terminal voltage, and an actual motor speed, and/or that can determine a back EMF and/or a motor load of autopilot pump 356, as described herein. In some embodiments, pump controller 355 may be configured to communicate with an external controller (e.g., controller 130 of FIG. 1) and receive pump control signals indicating direction, duration, and/or amplitude of pump control signals to be provided to a motor for autopilot pump 356. Motor sensors of pump controller 355 may include one or more current sensors, voltage sensors, RPM sensors, temperature sensors, and/or other motor sensors, for example, and can be referenced to various terminals of a pump motor including individual winding terminals. As noted herein, each element of system 350, and particularly pump controller 355, may be implemented with an antenna, a logic device, and/or other analog and/or digital components enabling that element to provide, receive, and process sensor signals and interface or communicate with one or more devices of system 350 and systems 100 and/or 200 of FIGS. 1 and 2. Further, a logic device of that element may be adapted to perform any of the methods described herein.

Also shown in FIG. 3 is the direction of propeller walk (left to right), the resulting assisting force (right to left on cylinder body 361), and the resulting expanded air volume 368 and compressed air volume 369. In the configuration shown in FIG. 3, pumping fluid into the B side of the system acts against the assisting force, and pumping fluid into the A side of the system acts with the assisting force.

When pumping fluid into the B side of system 350, steering actuator 360 may produce a response that can be reliably estimated by determining the corresponding linear steering actuator speed (e.g., rudder speed) from the applicable linear hydraulic slip contributions (e.g., the load and speed based linear slip rate and any system directional imbalance linear slip rate) that may be derived from pump control signals provided to autopilot pump 356 and/or pump sensor signals indicating supply voltage, back EMF, and/or pump speed. In some embodiments, the load and speed based linear slip rate of autopilot pump 356 is substantially constant over the steering actuator positions and operations caused by pump controller 355, regardless of a speed of the mobile structure and/or assisting forces on steering actuator 360. In such embodiments, the linear steering actuator speed may be derived from pump control signals.

When pumping fluid into the A side of system 350, steering actuator 360 may produce a response that can be reliably estimated by determining the corresponding linear steering actuator speed, estimating the elasticity of system 350 that may depend partially on a measured yaw rate of a coupled mobile structure (e.g., from gyroscope/accelerometer 144 of FIG. 1), and then determining a corrected linear steering actuator speed from the estimated elasticity and the linear steering actuator speed, as described herein. In some embodiments, the linear steering actuator speed may be properly corrected using the estimated elasticity by ratcheting the response of the estimated elasticity in accordance with the action of check valve assembly 359, as described herein. For example, a controller (e.g., controller 130) may be configured to determine a ratchet balancing component based on a pump control signal (e.g., provided by pump controller 355) and the elasticity estimate, where the ratchet balancing component corresponds to an expansion and/or compression of a volume of air in system 350 that is approximately equal to the magnitude of the elasticity estimate, the expansion takes place over a relatively short period of time, the compression takes place over a relatively long period of time, and the various periods of time correspond roughly to the actual elasticity response in system 350. As such, the ratchet balancing component may be configured to compensate for the elastic response of system 350 to one or more pump control signals provided by pump controller 355.

In various embodiments, the estimated elasticity of system 350 may be adaptive with respect to a measured response of system 350 and a coupled mobile structure. For example, a controller may be configured to determine a virtual rudder error from a prior virtual rudder estimate (e.g., derived from a prior elasticity estimate) and, in some embodiments, a yaw rate of the coupled mobile structure. In such embodiments, the elasticity estimate may be determined from the virtual rudder error and the measured yaw rate, which helps drive the elasticity estimate towards a value that is reliably representative of the response of system 350.

Figure 4:
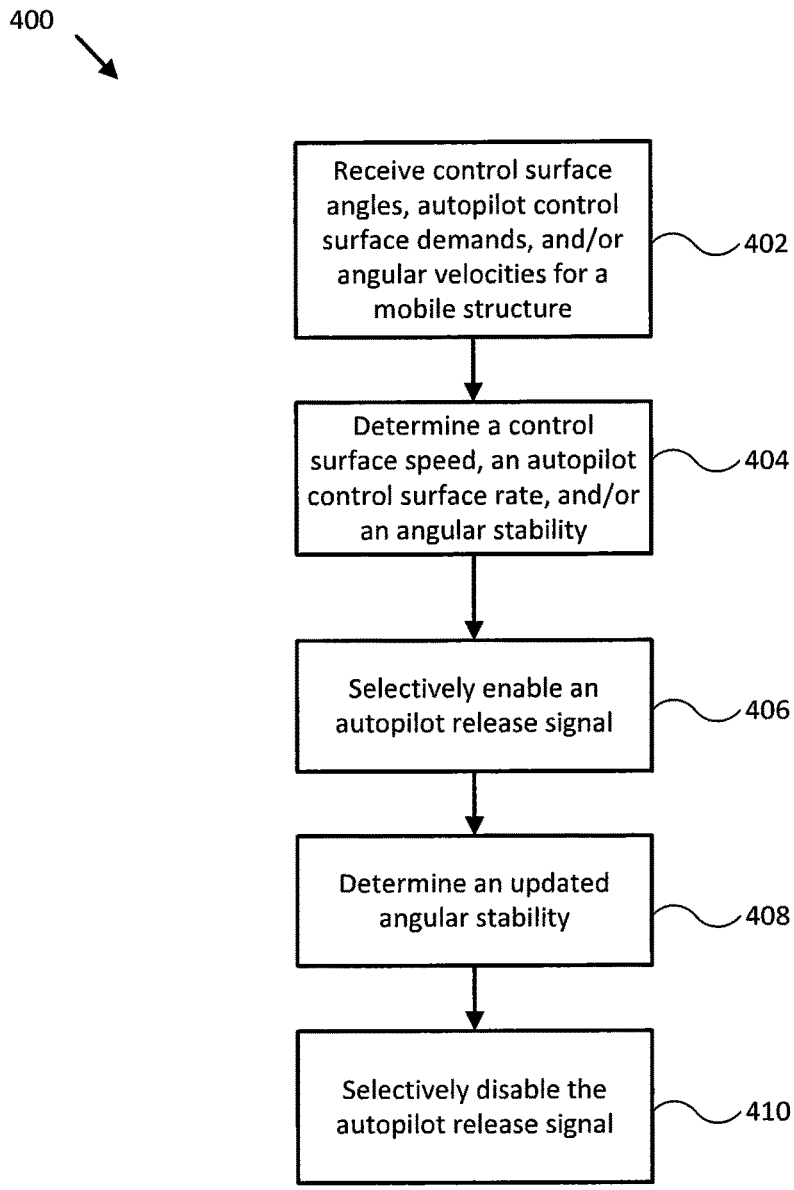
FIG. 4 illustrates a flow diagram of various operations to provide autopilot autorelease in accordance with embodiments of the disclosure.

FIG. 4 illustrates a flow diagram of process 400 to provide autopilot autorelease in a hydraulic steering system for mobile structure 101 in accordance with embodiments of the disclosure. In some embodiments, the operations of FIG. 4 may be implemented as software instructions executed by one or more logic devices associated with corresponding electronic devices and/or sensors of system 100 of FIG. 1, system 200 of FIG. 2, and/or system 350 of FIG. 3. More generally, the operations of FIG. 4 may be implemented with any combination of software instructions and/or electronic hardware (e.g., inductors, capacitors, amplifiers, or other analog and/or digital components).

It should be appreciated that any step, sub-step, sub-process, or block of process 400 may be performed in an order or arrangement different from the embodiments illustrated by FIG. 4. For example, in other embodiments, one or more blocks may be omitted from the process. Furthermore, block inputs, block outputs, various sensor signals, sensor information, calibration parameters, and/or other operational parameters may be stored to one or more memories of systems 100, 200, and/or 350 prior to moving to a following portion of a corresponding process. Although process 400 is described with reference to systems 100, 200, and 350, process 400 may be performed by other systems different from systems 100, 200, and 350 and including a different selection of electronic devices, sensors, mobile structures, and/or mobile structure attributes.

In block 402, a logic device receives control surface angles, autopilot control surface demands, and/or angular velocities for a mobile structure. For example, controller 130 may be configured to receive one or more control surface angles (e.g., a measurement of an orientation of rudder 266 and/or an articulated version of propulsion system 170) from steering sensor/actuator 150 (e.g., separate from, or integrated with propulsion system 170), an autopilot control surface demand (e.g., a pump control signal and/or a pump sensor signal corresponding to autopilot pump controller 355 and/or autopilot pump 356) from controller 130 and/or autopilot pump controller 355, and/or an angular velocity corresponding to a direction of motion for mobile structure 101 generated by the control surface (e.g., a yaw rate corresponding to the yaw for mobile structure 101 generated by rudder 266) from orientation sensor 140 and/or gyroscope/accelerometer 144.

In some embodiments, controller 130 may be configured to receive various pump control and/or sensor signals, for example, and determine virtual control surface estimates based, at least in part, on the signals. For example, controller 130 may be implemented and/or operated to determine such virtual control surface estimates (e.g., virtual rudder estimates, in one embodiment) using any one or combination of systems and/or methods described in U.S. patent application Ser. No. 15/222,905 filed Jul. 28, 2016 and entitled "HYDRAULIC SLIP COMPENSATION SYSTEMS AND METHODS", which is hereby incorporated by reference in its entirety. In such embodiments, controller 130 may be configured to use the virtual control surface estimates as the control surface angles.

In block 404, a logic device determines a control surface speed, an autopilot control surface rate, and/or and angular stability for the mobile structure. For example, controller 130 may be configured to determine the control surface speed from the control surface angles provided in block 402, and likewise the autopilot control surface rate from the autopilot control surface demands, and the angular stability from the angular velocities provided in block 402.

In embodiments where the control surface angles are provided by steering sensor/actuator 150 (e.g., separate from, or integrated with propulsion system 170) and/or are determined virtual control surface estimates, for example, controller 130 may be configured to determine the control surface speed by differentiating the control surface angles. In some embodiments, the sensor measurements and/or estimates may be filtered and/or otherwise processed (e.g., a hysteresis filter may be applied) to reduce or eliminate noise in the measurements and/or estimates. In other embodiments, the speed may be filtered and/or processed to reduce noise in the speed.

In embodiments where the autopilot control surface demands correspond to pump control signals, for example, controller 130 may be configured to determine the autopilot control surface rate by differentiating the pump control signals. For instance, an autopilot control surface demand may correspond to the difference and/or error between a target heading and a measured heading for mobile structure 101. A corresponding pump control signal may include the error and/or other digital and/or analog signals corresponding to the error, for example. In various embodiments, controller 130 may be configured to determine the control surface demand using any one or combination of systems and/or methods described in U.S. patent application Ser. No. 15/239,760 filed Aug. 17, 2016 and entitled "ACCELERATION CORRECTED ATTITUDE ESTIMATION SYSTEMS AND METHODS", U.S. Provisional Patent Application No. 62/099,022 filed Dec. 31, 2014 and entitled "STABILIZED DIRECTIONAL CONTROL SYSTEMS AND METHODS", U.S. Provisional Patent Application No. 62/099,016 filed Dec. 31, 2014 and entitled "ADAPTIVE TRACK KEEPING SYSTEMS AND METHODS", and/or U.S. Provisional Patent Application No. 62/099,032 filed Dec. 31, 2014 and entitled "PROACTIVE DIRECTIONAL CONTROL SYSTEMS AND METHODS", which are hereby incorporated by reference in their entirety.

In embodiments where the autopilot control surface demands correspond to pump sensor signals, such as PWM signals and/or other power signals corresponding to autopilot pump controller 355 and/or autopilot pump 356, for example, controller 130 may be configured to determine the autopilot control surface rate by determining a value for the pump sensor signals. For instance, a PWM signal may correspond to a positive or negative signal (e.g., a forward or reverse pump motion), and may include an amplitude, pulse width, and/or pulse rate corresponding to an autopilot control surface rate (e.g., where the rate of the pump is roughly directly proportional to the desired rate of change in orientation of the control surface).

In various embodiments, controller 130 may be configured to determine the angular stability based on the angular velocities provided in block 402. For example, controller 130 may be configured to compare the magnitude of one or more angular velocities to a predetermined threshold, which may be factory set, user-supplied, and/or adaptively determined and/or adjusted to differentiate motion of mobile structure 101 due to user intervention from typical and/or actual environmental conditions. In such embodiments, the angular stability may be implemented as a binary state variable where mobile structure 101 is considered stable if the one or more angular velocities are less than or equal to one or more corresponding predetermined thresholds.

In block 406, a logic device selectively enables an autopilot release signal. For example, controller 130 may be configured to selectively enable an autopilot release signal and/or provide the autopilot release signal to autopilot controller 355 and/or another device (e.g., a switch) configured to electrically decouple autopilot pump 356 and/or autopilot pump controller 355 from power and/or various pump control signals. In some embodiments, controller 130 may be configured to monitor the autopilot release signal and control itself to discontinue providing pump control signals and/or power to autopilot pump 355 accordingly.

In one embodiment, controller 130 may be configured to determine a product of the control surface speed and the autopilot control surface rate. Such product indicates when the polarities of the speed and the rate are different (e.g., they are fighting each other) and/or when one or both are zero. For example, the autopilot control surface rate is necessarily zero while the autopilot release signal is enabled, and this state can be used to automatically determine when to disable the autopilot release signal, as discussed in block 410.

In another embodiment, controller 130 may be configured to determine that the control surface speed is non-zero or a magnitude of the angular velocity is greater than a predetermined threshold. The first binary state variable indicates whether mobile structure is being actively steered, and the second binary state variable indicates whether mobile structure 101 is stable, as discussed with respect to block 404. If either is true, then controller 130 may be configured to enable or hold the autopilot release signal since mobile structure 101 is being actively steered or is unstable enough to require a user at the helm. For example, if the product of the control surface speed and the autopilot control surface rate indicates that a user is fighting the autopilot, or that the autopilot is already effectively disabled by the autopilot release signal, then controller 130 may continue to enable or assert the autopilot release signal.

Notably, none of the methods to determine the state variables described above require a user to actuate a standby mode button or require a user activity sensor at the helm or helm pump to determine when to enable the autopilot release signal. Furthermore, in embodiments where the control surface angles are determined from virtual control surface estimates and the autopilot control surface demands are determined from pump control signals, no actuator and/or pump sensors are required at all.

In block 408, a logic device determines an updated angular stability. For example, controller 130 may be configured to determine the updated angular stability from one or more updated angular velocities received in a method similar to that described in block 402. Furthermore, the angular stability may be determined using a methods similar to that described in block 404, such as by comparison of a magnitude of an angular velocity to a predetermined threshold, for example. Such stability may in some embodiments be a prerequisite to disabling the autopilot release signal enabled in block 406. In some embodiments, other and/or additional prerequisites to disabling the autopilot release signal may be required. For example, controller 130 may be configured to determine the control surface speed is substantially zero (e.g., by comparing a filtered and/or low noise control surface speed) before disabling the autopilot release signal.

In block 410, a logic device selectively disables the autopilot release signal. For example, controller 130 may be configured to selectively disable the autopilot release signal based on the angular velocity and/or angular stability received/determined in block 402/406. In further embodiments, controller 130 may be configured to only disable the autopilot release signal when mobile structure 101 is stable and there is little to no steering input at the control surface (e.g., a user has stopped providing overriding input to a helm pump).

Embodiments of the present disclosure can thus disable, decouple, and/or de-energize autopilot pump 356 of hydraulic steering system 350 by comparing an intended autopilot rudder rate with a measured rudder rate to disengage the autopilot pump when the helm is sufficiently disturbed by a user/operator. Such embodiments may be used to automatically release the autopilot on a mobile structure without having to manually activate autopilot standby or risking a partially activated autopilot interfering with urgent steering maneuvers.

It is contemplated that any one or combination of methods to provide autopilot release signals may be performed according to one or more operating contexts of a control loop, for example, such as a startup, learning, running, and/or other type operating context. For example, any portion of process 400 may proceed back to an initial block and proceed through the corresponding process again to retrieve updated control surface angles, autopilot control surface demands, angular velocities, and/or other sensor and/or control signals, as in a control loop. In one embodiment, controller 130 may be configured to enable the autopilot release signal and then proceed through multiple passes through process 400 until the various state variables allow controller 130 to disable the autopilot release signal, as described herein.

Figure 5:
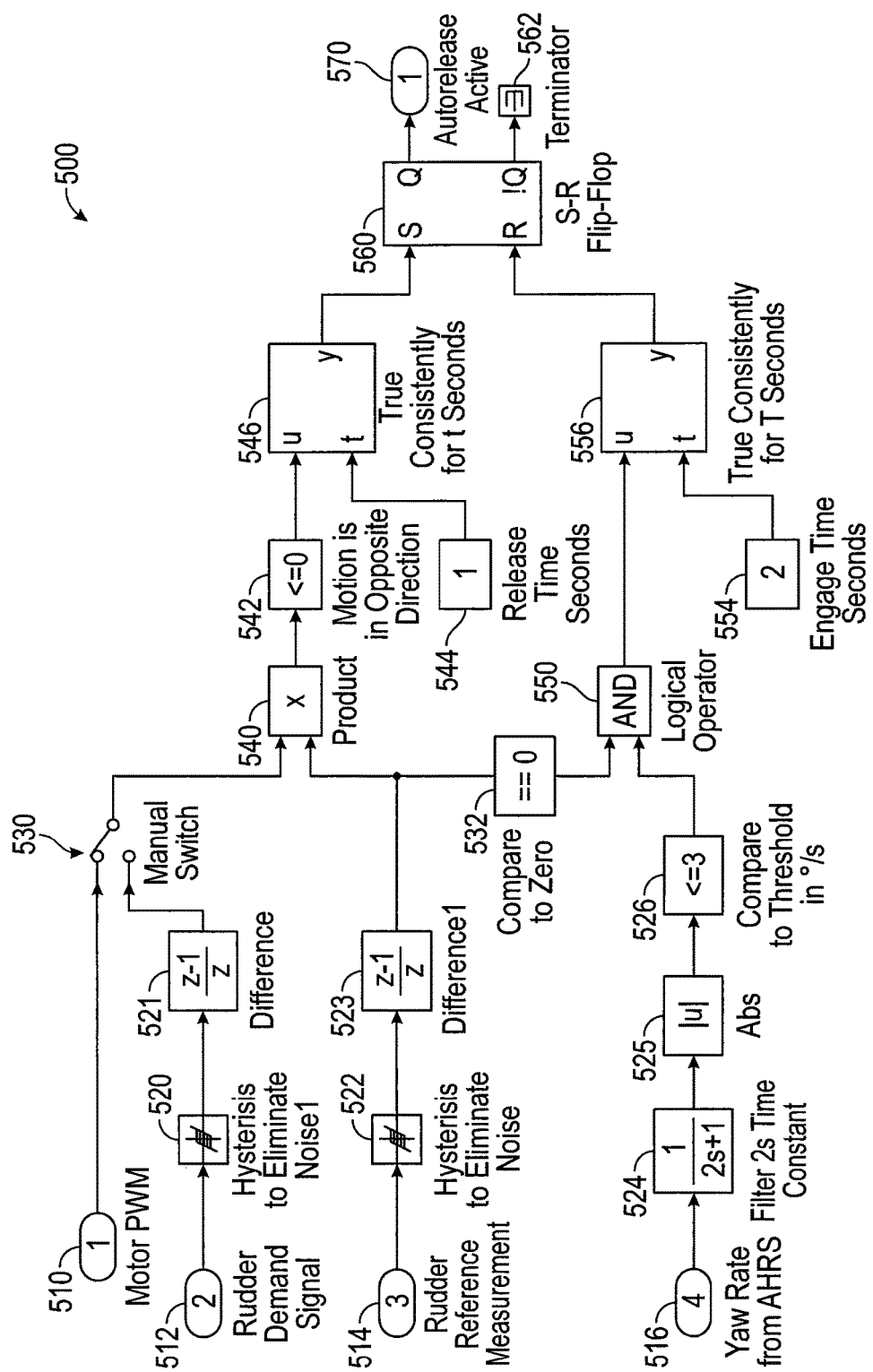
FIG. 5 illustrates a flow diagram of various control loops and other operations to provide autopilot autorelease in accordance with embodiments of the disclosure.

FIG. 5 illustrates a flow diagram and/or control loop of process 500 to provide autopilot autorelease in a hydraulic steering system for mobile structure 101 in accordance with embodiments of the disclosure. In some embodiments, the operations of FIG. 5 may be implemented as software instructions executed by one or more logic devices associated with corresponding electronic devices and/or sensors of system 100 of FIG. 1, system 200 of FIG. 2, and/or system 350 of FIG. 3. More generally, the operation of FIG. 5 may be implemented with any combination of software instructions and/or electronic hardware (e.g., inductors, capacitors, amplifiers, or other analog and/or digital components).

It should be appreciated that any step, sub-step, sub-process, or block of process 500 may be performed in an order or arrangement different from the embodiments illustrated by FIG. 5. For example, in other embodiments, one or more blocks and/or elements may be omitted from the various processes, and blocks and/or elements from one process may be included in another process. Furthermore, inputs, outputs, various sensor signals, sensor information, calibration parameters, and/or other operational parameters, constants, state variables or other information may be stored to one or more memories of systems 100, 200, and/or 350 prior to moving to a following portion of a corresponding process. Although process 500 is described with reference to systems 100, 200, and 350, process 500 may be performed by other systems different from systems 100, 200, and 350 and including a different selection of electronic devices, sensors, mobile structures, and/or mobile structure attributes.

As can be seen from FIG. 5, process 500 may be configured to accept a variety of inputs 510, 512, 514, and/or 516 and provide an enabled or disabled autopilot release signal at output 570. Each of the input signals may be conditioned (if beneficial) to remove noise and/or to prepare them to be compared against each other in the binary logic portion of process 500 (e.g., starting at blocks 526, 532, and 542). The comparison portion of process 500 determines the conditions under which output 570 is enabled or disabled. In general, S-R Flip-Flop 560 only allows output 570 to be enabled if process 500 detects user influence on a control surface that conflicts with the autopilot control, and S-R Flip-Flop 560 only allows output 570 to be subsequently disabled if the conflict subsides and mobile structure becomes stable.

Motor PWM signal 510 may be implemented as a pump control or sensor signal corresponding to a powered state of autopilot pump 356. In various embodiments, motor PWM signal 510 may be characterized by an amplitude, pulse width, and/or pulse rate, each of which may relate to a pump rate of autopilot pump 356, which may be roughly directly proportional to a corresponding autopilot control surface rate (e.g., a desired control surface/rudder speed of rudder 266). Rudder demand signal 512 (e.g., autopilot control surface demand 512) may in some embodiments be implemented as a pump control signal corresponding to a desired control surface/rudder position or orientation. As noted herein, rudder demand signal 512 may also correspond to an error signal or difference between a target heading and a measured heading for mobile structure 101. In some embodiments, rudder demand signal 512 may be filtered by hysteresis block 520 and differentiated by block 521 to produce a corresponding autopilot control surface rate at switch block 530.

In some embodiments, switch block 530 may be implemented as a manual switch actuated by a user based on preference for one or the other signal due to the types of noise in the respective signal, for example. In other embodiments, switch block 530 may be controlled by controller 130, for example. In such embodiments, controller 130 may be configured to select one signal over another based on presence of the signal, noise characteristics of the signal, adaptive learning techniques linking one signal to better response for a particular environmental condition, and/or other criteria. For example, controller 130 may be configured to select motor PWM 510 by default and to switch to the other signal if a noise level of motor PWM 510 passes a predetermined threshold.

Rudder reference measurement 514 (e.g., control surface angle 514) may be implemented as a sensor signal from steering sensor/actuator 150 and be configured to provide precise rudder angle information through direct measurement. In other embodiments, rudder reference measurement 514 may be implemented as a virtual rudder estimate based, at least in part, on one or more pump control and/or sensor signals, as described herein. In some embodiments, rudder reference measurement 514 may be filtered by hysteresis block 522 and differentiated by block 521 to produce a corresponding control surface speed at product block 540 and comparison block 532.

Yaw rate 516 (e.g., angular velocity 516) may be implemented as a sensor signal from orientation sensor 140 and/or gyroscope/accelerometer 144. For example, in some embodiments, controller 130 may be configured to receive a measured yaw rate of mobile structure 101 from gyroscope/accelerometer 144. In further embodiments, controller 130 may be configured to receive a time series of measured headings of mobile structure 101 from orientation sensor 140, for example, and calculate a yaw rate from the series of measured headings. In various embodiments, yaw rate 516 may be filtered by block 524, converted to a magnitude by block 525, and compared to a predetermined threshold (e.g., 3 degrees/second) in block 526 to produce a corresponding binary state variable indicating, roughly, whether mobile structure 101 is stable (e.g., the angular velocity is equal to or below the predetermined threshold). More generally, any angular velocity may be processed similarly, but the angular velocity and/or velocities should correspond to the motion or motions generated by actuation of the control surface corresponding to inputs 510, 512, and 514.

At blocks 540 and 542, the autopilot control surface rate is multiplied by the control surface speed and the result is compared to zero to determine if their polarities match (e.g., to determine if a user is attempting to act against the autopilot) or if one or both are zero (e.g., to determine if the autopilot release signal is enabled and/or if the autopilot is disabled or off). Block 542 may be configured to output logical true if either signal is zero or if their polarities differ.

At blocks 532 and 550, the control surface speed is compared to zero (e.g., block 532 may be configured to output logical true if the control surface speed is zero) and the result is compare to the stability state of mobile structure 101 (e.g., block 526 may be configured to output logical true if mobile structure 101 is stable/the magnitude of yaw rate 516 is below a predetermined threshold). And block 550 may be configured to output logical true only when the control surface speed is zero (e.g., the user and the autopilot are not conflicting) and mobile structure 101 is stable.

At blocks 544, 546, 554, and 556, the two logic states output by respective blocks 542 and 550 are filtered biased to zero or logical false to reduce noise and/or false positives in the various input signals and block outputs. If the outputs of either block 542 or 550 are consistently true over a time period on the order of seconds, the output or outputs are forwarded to block 560.

As shown in FIG. 5, block 560 may be implemented as a S-R Flip-Flop or latch used to latch and release (e.g., enable or disable) the autopilot release signal provided on output 570. In various embodiments, the truth table for block 560 may be implemented as follows, in the format (S,R:Q): (0,0:Q(n−1)), (0,1:0), (1,0:1), (1,1:0); where Q(n−1) is the previous state (e.g., the latched state) of Q). As a result, in the embodiment shown in FIG. 5, block 560 only enables output 570 when S is true and R is false, which equates to the control surface speed being non-zero (e.g., rudder 266 is in motion) and/or mobile structure 101 being unstable (e.g., yaw rate 516 is above a predetermined threshold), and, at the same time, the control surface speed or the autopilot control surface rate being zero (e.g., the autopilot is already disabled) or having different polarities (e.g., conflicting). Furthermore, block 560 latches the autopilot release signal as enabled and only disables an enabled output 570 when R is true (e.g., the control surface speed is substantially zero and mobile structure 101 is stable. Block 562 terminates an unused logic output of block 560.

Output 570 may in various embodiments be coupled to autopilot pump controller 355, for example, and autopilot pump controller 355 may be configured to discontinue providing pump control signals and/or power to autopilot pump 356. In other embodiments, a separate device or switch may be coupled to output 570 and be configured to electrically decouple autopilot pump controller 355 and/or autopilot pump 356 from control signals and/or power. In further embodiments, controller 130 may be configured to monitor output 570 and discontinue or pause an autopilot process or system accordingly.

Thus, embodiments of the present disclosure can automatically release an autopilot on a mobile structure without a user having to take the time and distraction to manually activate an autopilot standby button or risk a partially activated autopilot interfering with urgent steering maneuvers. Moreover, various embodiments of the present disclosure may be configured to provide autopilot autorelease with minimal sensor input, including without control surface and/or steering reference sensors, which are typically prone to failure.

In some embodiments, an operation to provide autopilot autorelease may advantageously operate according to multiple autorelease observation cycles while an autopilot is engaged, for example, where each autorelease observation cycle is kept relatively short (e.g., as compared to a continuous process) to limit detrimental effects of signal drift and accumulated error. Such embodiments may be configured substantially to rely on only three updating state inputs (e.g., autopilot motor PWM, autopilot motor speed, and control surface angle, as measured by a control surface reference sensor) and one minimum release threshold (e.g., how much a user expects to turn a helm against an autopilot before an autopilot release signal is generated) configured to substantially eliminate false positive autopilot release signals. By limiting the number of updating state inputs, embodiments provide relatively stable and robust autopilot release signals over a variety of operating conditions. FIGS. 6-9 illustrate various processes and control loops that may be used to implement such embodiments.

Figure 6:
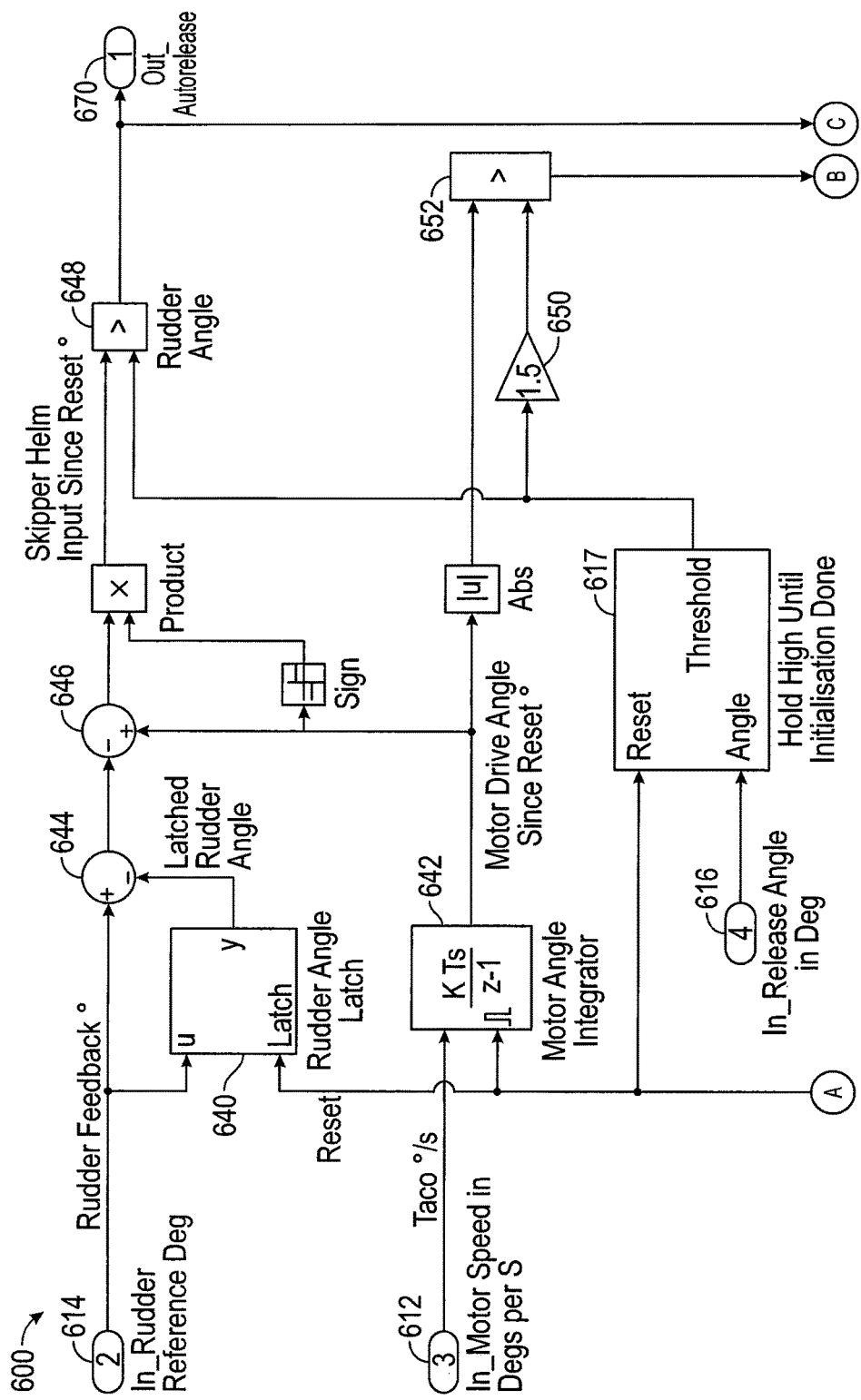
FIG. 6 illustrates a flow diagram of various control loops and other operations to provide autopilot autorelease in accordance with embodiments of the disclosure.
Figure 6:
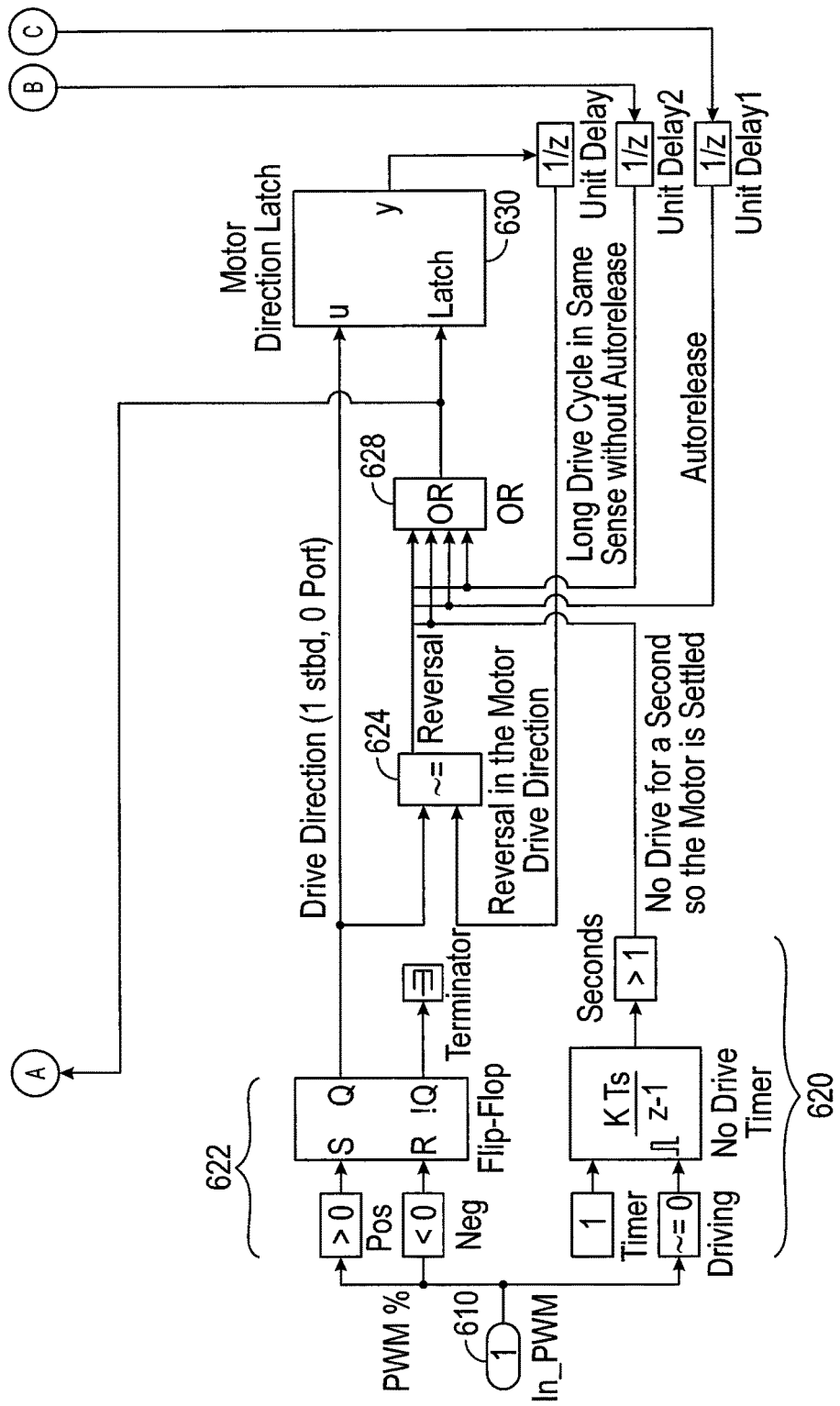

FIG. 6 illustrates a flow diagram and/or control loop of process 600 to provide autopilot autorelease in a hydraulic steering system for mobile structure 101 in accordance with embodiments of the disclosure. In some embodiments, the operations of FIG. 6 may be implemented as software instructions executed by one or more logic devices associated with corresponding electronic devices and/or sensors of system 100 of FIG. 1, system 200 of FIG. 2, and/or system 350 of FIG. 3. More generally, the operation of FIG. 6 may be implemented with any combination of software instructions and/or electronic hardware (e.g., inductors, capacitors, amplifiers, or other analog and/or digital components).

It should be appreciated that any step, sub-step, sub-process, or block of process 600 may be performed in an order or arrangement different from the embodiments illustrated by FIG. 6. For example, in other embodiments, one or more blocks and/or elements may be omitted from the various processes, and blocks and/or elements from one process may be included in another process. Furthermore, inputs, outputs, various sensor signals, sensor information, calibration parameters, and/or other operational parameters, constants, state variables or other information may be stored to one or more memories of systems 100, 200, and/or 350 prior to moving to a following portion of a corresponding process. Although process 600 is described with reference to systems 100, 200, and 350, process 600 may be performed by other systems different from systems 100, 200, and 350 and including a different selection of electronic devices, sensors, mobile structures, and/or mobile structure attributes.

As can be seen from FIG. 6, process 500 may be configured to accept a variety of inputs 610, 612, 614, and/or 616 and provide an enabled or disabled autopilot release signal at output 670. At a high level, OR block 628 is configured to generate a reset signal based on a variety of criteria, including criteria indicative of a user attempting to manually override an operating autopilot. When a reset signal is enabled, thereby signaling the beginning/initialization of an autorelease observation cycle, the actual driven control surface angle (e.g., derived from rudder reference measurement 614) and the estimated autopilot driven control surface angle (e.g., derived from autopilot pump speed signal 612) are each accumulated over the duration of the autorelease observation cycle and sampled for comparison to each other as part of each iteration of process/control loop 600.

Any manual user input occurring during the autorelease observation cycle is evident in the difference between the accumulated actual driven control surface angle and the accumulated estimated autopilot driven control surface angle, provided by comparison/difference node 646. Once sufficient manual input is detected in a single autorelease observation cycle to overcome a minimum release threshold, autopilot release signal/output 570 is enabled. In the embodiment shown in FIG. 6, the current autorelease observation cycle is reset when the autopilot release signal 670 is enabled, thereby restarting the detection and accumulation processes. Each autorelease observation cycle may include one or multiple iterations of process/control loop 600, and the iteration rate is typically limited only by one or more of the update rates of the various inputs, or by a predetermined iteration delay. Common update rates (e.g., iteration rates) for process 600 are 50 ms, or 200 times per second.

Each of the input signals may be conditioned (if beneficial) to remove noise and/or to prepare them to be compared against each other in other portions of process 600 (e.g., primarily at blocks 44, 646, 648, and 652). The comparison portion of process 600 determines the conditions under which output 570 is enabled or disabled during an autorelease observation cycle. In general, comparison block 648 only allows output 570 to be enabled if process 600 detects user influence on a control surface that conflicts with the autopilot control and that is sufficiently above a minimum release threshold (e.g., minimum release threshold 616).

Motor PWM signal 610 (e.g., an autopilot control surface demand) may be implemented as a pump control or sensor signal corresponding to a powered state of autopilot pump 356. In various embodiments, motor PWM signal 610 may be characterized by an amplitude, pulse width, and/or pulse rate, each of which may relate to a pump rate of autopilot pump 356, which may be roughly directly proportional to a corresponding autopilot control surface rate (e.g., a desired control surface/rudder speed of rudder 266). In general, motor PWM signal 610 may be used to determine an autopilot pump drive direction and/or a lack of drive (e.g., an autopilot pump drive of approximately zero), as shown in process 600.

For example, as shown in FIG. 6, motor PWM signal 610 may be provided to block 622, which may be configured to indicate a positive or negative (starboard or port) drive direction of autopilot pump 356. Upon a detected reset, the current autopilot pump drive direction may be latched or stored in block 630, and that stored value may be compared to subsequent autopilot pump drive directions at comparison block 624 in order to detect an autopilot pump drive reversal (e.g., a reversal in direction). Upon such detection, comparison block 624 may provide a reset signal to OR block 628 for distribution to blocks 617, 630, 640, and 642 and, thereby, initialize an autorelease observation cycle.

Motor PWM signal 610 may also be provided to block 620, which may be configured to detect when an autopilot pump drive is approximately zero over a predetermined minimum period of time, such as 1-2 seconds, for example. Upon such detection (e.g., where there is substantially no autopilot activity and the historic drive direction is meaningless), block 620 may provide a reset signal to OR block 628 for distribution to blocks 617, 630, 640, and 642 and, thereby, initialize an autorelease observation cycle.

Upon initialization of an autorelease observation cycle, blocks 640, 642, 644, and 646 may be configured to accumulate and compare actual driven control surface angles and estimated autopilot driven control surface angles derived from rudder reference measurement 614 and autopilot pump speed signal 612, respectively.

Autopilot pump speed signal 612 (e.g., an autopilot control surface demand) may in some embodiments be implemented as a pump sensor signal corresponding to a measured speed of autopilot pump 356, which may be roughly directly proportional to an estimated driven control surface/ rudder speed or rate. For example, autopilot pump speed signal 612 may be derived from a measured tachometer feedback from autopilot pump 356. Such tachometer feedback signal may be measured directly (e.g., though use of an optical detector and marks along a rotating shaft or other portion of autopilot pump 356, for example), can be derived from a DC motor back emf (e.g., by momentarily removing power from or "floating" a motor for autopilot pump 356, sensing the generated voltage/back emf, and determining a motor speed based on the sensed voltage and/or voltage over time), and/or can be determined through other motor tachometer feedback techniques. In specific embodiments, autopilot pump 356 may be sampled in such fashion every 40 to 50 milliseconds to determine the corresponding autopilot pump speed signal. In some embodiments, autopilot pump speed signal 612 may be filtered and/or otherwise processed to produce a corresponding estimated autopilot driven control surface rate at integrator block 642. In other embodiments, autopilot pump speed signal 612 may be provided as a measured motor angle speed in degrees per second to integrator block 642, and integrator block 642 may include one or more calibration parameters configured to convert the measured motor angle speed to a control surface angle speed.

Upon receiving a reset signal, integrator block 642 may be configured to accumulate and integrate autopilot pump speed signal 612 to provide an estimated autopilot driven control surface angle to blocks 646 and 652, as shown. In various embodiments, the estimated autopilot driven control surface angle is a measure of the expected autopilot rudder angle accumulated since the reset signal was received (e.g., since the autorelease observation cycle was initiated). If there is no manual user input, the estimated autopilot driven control surface angle should be approximately equal to the actual driven control surface angle (e.g., as derived from rudder reference measurement 614).

Rudder reference measurement 614 (e.g., control surface angle 614) may be implemented as a sensor signal from steering sensor/actuator 150 and be configured to provide precise rudder angle information through direct measurement. In other embodiments, rudder reference measurement 614 may be implemented as a virtual rudder estimate based, at least in part, on one or more pump control and/or sensor signals, as described herein. In various embodiments, rudder reference measurement 614 may be provided to blocks 640 and 644.

Upon receiving a reset signal, block 640 may be configured to store/latch a first rudder reference measurement/actual control surface angle (e.g., corresponding to the initialization of the observation cycle) and provide the stored first rudder reference measurement to block 644. Block 644 may be configured to determine a difference between the first rudder reference measurement and any subsequent rudder reference measurements/actual control surface angles (e.g., after the beginning of the autorelease observation cycle and within the autorelease observation cycle), thereby providing the actual driven control surface angle accumulated since the reset signal was received (e.g., since the autorelease observation cycle was initiated) to block 646. Block 646 may be configured to determine a difference between the actual driven control surface angle provided by block 644 and the estimated autopilot driven control surface angle provided by block 642, and then to provide the resulting estimated manual helm input (e.g., adjusted for proper sign) to comparison block 648.

Comparison block 648 may be configured to selectively enable autopilot release signal/output 670 based on the estimated manual helm input provided by block 646 and a predetermined minimum release threshold provided by block 617 and derived from minimum release threshold 616. If the estimated manual helm input is greater than the minimum release threshold provided by block 617, comparison block 648 may be configured to enable autopilot release signal/output 670, which also provides a reset signal to OR block 628 for distribution to blocks 617, 630, 640, and 642 and, thereby, initialize another autorelease observation cycle. Such reset signal zeros out any estimated manual helm input accumulated during the prior autorelease observation cycle, which allows process 600 to re-engage the autopilot quickly reliably upon cessation of manual helm input.

Minimum release threshold 616 may be implemented as a predetermined or preset value stored locally in memory, provided by a user (e.g., through user input provided to user interface 120), and/or otherwise made available to controller 130 and/or block 617 of process 600. Typical values for minimum release threshold 616 may range between 1 degree and 3 degrees of control surface angle, depending on characteristics of the ship, the steering system, the autopilot, the user, the environmental congestion/navigation hazards, and/or other characteristics. Minimum release threshold 616 may be a constant, for example, or may be adjusted adaptively based on a state of mobile structure 101, such as speed, navigation area, and/or other states of mobile structure 101. Block 617 may be configured to provide a relatively high (e.g., impossibly high) release threshold to blocks 648 and 650 to block enablement of the autopilot release signal and/or generation of a reset signal by block 652, until process 600 is properly initialized (e.g., the various inputs are relatively stable and error-free) and a reset signal has been provided to block 628 by means other than blocks 648 and/or 652. Upon receiving a reset signal, block 617 may be configured to pass through minimum release threshold 616 to blocks 648 and/or 650/652, as shown.

In various embodiments, blocks 650 and 652 may be configured to keep all autorelease observation cycles relatively short in duration so as to avoid accumulation of errors in process 600, and particularly to avoid accumulation of error in the output of integrator block 642 (e.g., caused by miscalibration and/or insufficient bit depth to properly calibrate an input autopilot pump speed signal 612 to an output estimated autopilot driven control surface angle). In the embodiment shown in FIG. 6, after an initial reset, minimum release threshold 616 is provided to gain block 650, which may be configured to multiply minimum release threshold 616 by a value greater than 1 (e.g., an attempt to allow the estimated manual helm input to trigger an autopilot release signal before the estimated autopilot driven control surface angle) and, typically, less than 2 (e.g., to cut off miscalibration errors greater than or equal to twice the minimum release threshold) and provide a resulting maximum integration reliability threshold to block 652. In other embodiments, block 650 may be replaced with another input similar to minimum release threshold 616, for example, configured to provide a predetermined maximum integration reliability threshold to block 652.

Comparison block 652 may be configured to compare the estimated autopilot driven control surface angle provided by integrator block 642 to the maximum integration reliability threshold provided by block 650. If the estimated autopilot driven control surface angle is greater than the maximum integration reliability threshold, comparison block 652 may be configured to provide a reset signal to OR block 628 for distribution to blocks 617, 630, 640, and 642 and, thereby, initialize another autorelease observation cycle. Such reset signal prevents motor drive durations from becoming too long (e.g., which risks a calibration error in block 642 causing false positive triggering/enabling of autopilot release signal/output 670).

Output 570 may in various embodiments be coupled to autopilot pump controller 355, for example, and autopilot pump controller 355 may be configured to discontinue providing pump control signals and/or power to autopilot pump 356. In other embodiments, a separate device or switch may be coupled to output 570 and be configured to electrically decouple autopilot pump controller 355 and/or autopilot pump 356 from control signals and/or power. In further embodiments, controller 130 may be configured to monitor output 570 and discontinue or pause an autopilot process or system accordingly.

Thus, embodiments of the present disclosure can automatically release an autopilot on a mobile structure without a user having to take the time and distraction to manually activate an autopilot standby button or risk a partially activated autopilot interfering with urgent steering maneuvers. Moreover, various embodiments of the present disclosure may be configured to provide autopilot autorelease with minimal sensor input, including without control surface and/or steering reference sensors, which are typically prone to failure.

Once an autopilot release signal is enabled, even momentarily, the corresponding autopilot (e.g., executed by controller 130) may be configured to enter a "release mode" such that autopilot control surface demands are no longer provided to autopilot pump controller 355 and/or autopilot pump 356, thereby allowing a user to control operation of steering sensor/actuator 150 and/or propulsion system 170 without constantly fighting the autopilot. While in such release mode, the autopilot may be configured to monitor the appropriate control surface angle (e.g., provided by steering sensor 150) and/or a heading of mobile structure 101 and automatically re-engage the autopilot when manual user input is no longer detected (e.g., rudder angle does not change by more than a threshold amount, such as 1-2 degrees, for a predetermined time period, such as 10-30 seconds).

When the autopilot is re-engaged after being released using the processes described herein, the autopilot may enter one of a variety of modes that may be preselected by a user or a manufacturer. For example, the autopilot may be configured to maintain the new current heading (e.g., continue straight), to maintain the new current heading relative to a measured wind direction, to track to a last valid waypoint and/or track designated prior to the autopilot release signal being enabled, and/or to autopilot mobile structure 101 according to other operational modes, as described herein.

Figure 7:
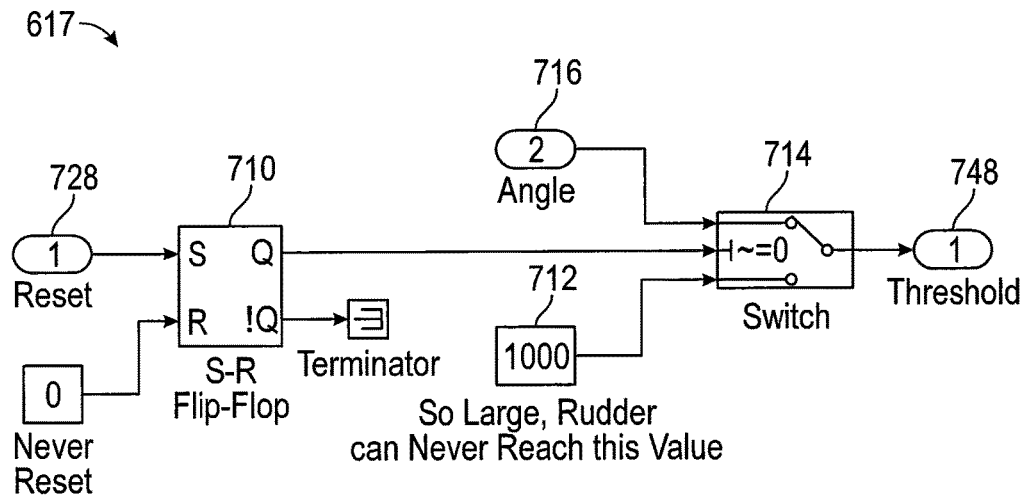
FIG. 7 illustrates a flow diagram of various control loops and other operations to provide autopilot autorelease in accordance with embodiments of the disclosure.

FIG. 7 illustrates a flow diagram corresponding to an embodiment of block 617 in FIG. 6. When process 600 of FIG. 6 is initialized, output Q of S-R Flip-Flip 710 in block 617 is initialized to zero. Thus, with inputs S and R at zero, output Q remains zero, and switch 714 selects impossibly high release threshold 712 for the output 748. When the first reset signal arrives at input 728, output Q of S-R Flip-Flip 710 changes to 1 and is locked at 1 until process 600 reinitializes and output Q is set to zero. Switch 714 then selects input 716 (e.g., minimum release threshold 616) for output 748.

Figure 8:
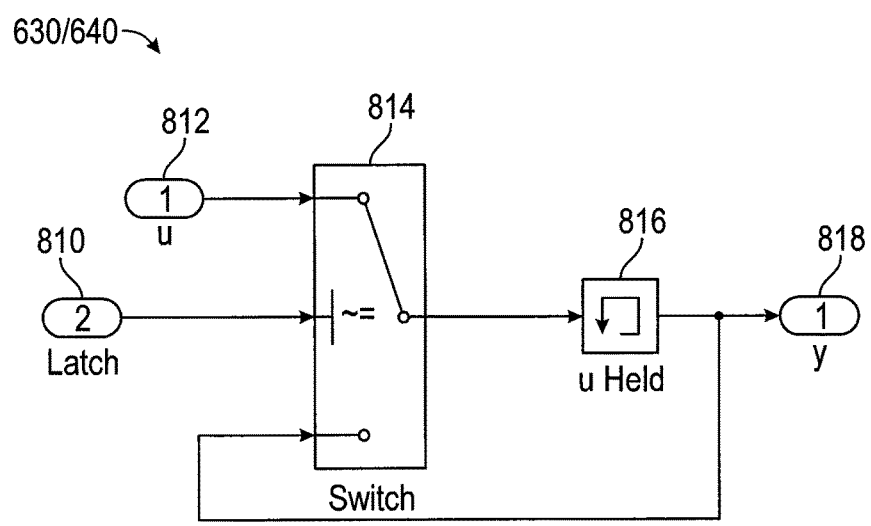
FIG. 8 illustrates a flow diagram of various control loops and other operations to provide autopilot autorelease in accordance with embodiments of the disclosure.

FIG. 8 illustrates a flow diagram corresponding to an embodiment of blocks 630 or 640 in FIG. 6. In both of blocks 630 and 640, latch input 810 is coupled to receive a reset signal from block 628. When latch input 810 is zero, switch 814 selects the output of memory block 816, provides that value to output 818, and latches/stores that value back into memory block 816. When latch input 810 is 1 (e.g., when the reset signal is received), switch 814 selects input 812 and provides that value to memory block 816, which then provides that value to output 818. When latch input 810 then reverts to zero, the prior value from input 812 is latched/stored into memory block 816 and provided to output 818.

Figure 9:
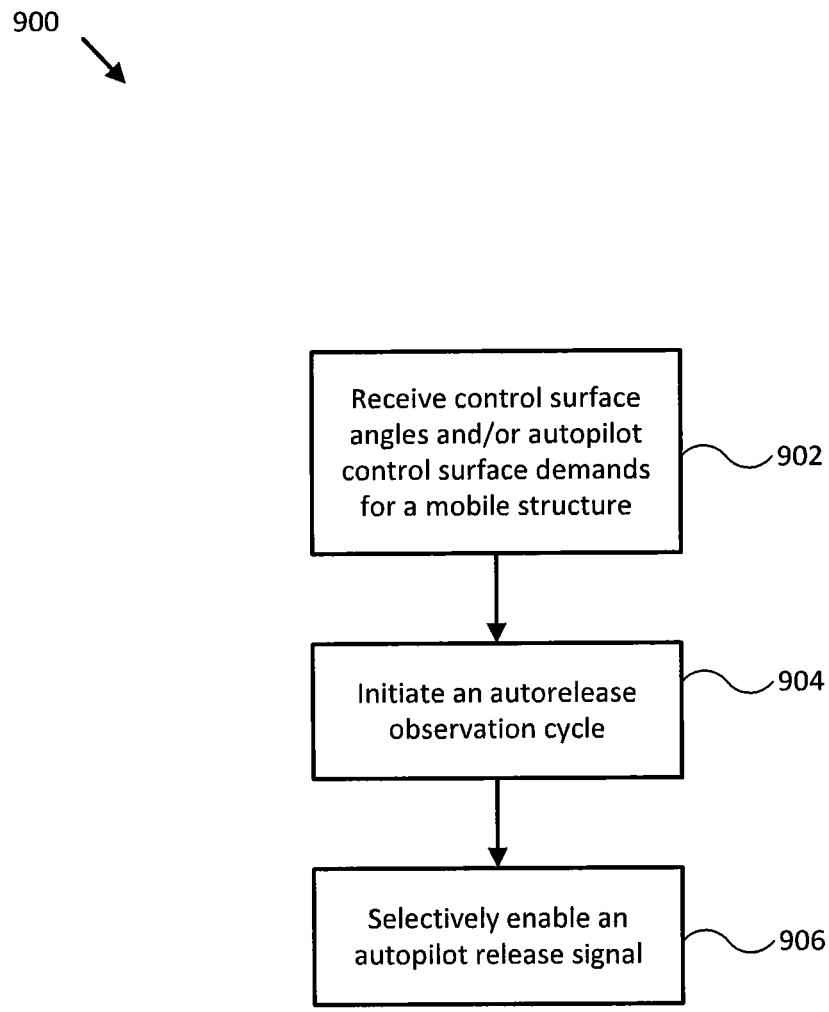
FIG. 9 illustrates a flow diagram of various operations to provide autopilot autorelease in accordance with embodiments of the disclosure.

FIG. 9 illustrates a flow diagram of process 400 to provide autopilot autorelease in a hydraulic steering system for mobile structure 101 in accordance with embodiments of the disclosure. In some embodiments, the operations of FIG. 9 may be implemented as software instructions executed by one or more logic devices associated with corresponding electronic devices and/or sensors of system 100 of FIG. 1, system 200 of FIG. 2, and/or system 350 of FIG. 3. More generally, the operations of FIG. 9 may be implemented with any combination of software instructions and/or electronic hardware (e.g., inductors, capacitors, amplifiers, or other analog and/or digital components).

It should be appreciated that any step, sub-step, sub-process, or block of process 900 may be performed in an order or arrangement different from the embodiments illustrated by FIG. 9. For example, in other embodiments, one or more blocks may be omitted from the process. Furthermore, block inputs, block outputs, various sensor signals, sensor information, calibration parameters, and/or other operational parameters may be stored to one or more memories of systems 100, 200, and/or 350 prior to moving to a following portion of a corresponding process. Although process 900 is described with reference to systems 100, 200, and 350, process 900 may be performed by other systems different from systems 100, 200, and 350 and including a different selection of electronic devices, sensors, mobile structures, and/or mobile structure attributes.

In block 902, a logic device receives control surface angles and/or autopilot control surface demands for a mobile structure. For example, controller 130 may be configured to receive one or more control surface angles (e.g., a measurement of an orientation of rudder 266) from steering sensor/actuator 150 and/or an autopilot control surface demand (e.g., a pump control signal and/or a pump sensor signal corresponding to autopilot pump controller 355 and/or autopilot pump 356) from controller 130 and/or autopilot pump controller 355.

In some embodiments, controller 130 may be configured to receive various pump control and/or sensor signals, for example, and determine virtual control surface estimates based, at least in part, on the signals. For example, controller 130 may be implemented and/or operated to determine such virtual control surface estimates (e.g., virtual rudder estimates, in one embodiment) using any one or combination of systems and/or methods described in U.S. patent application Ser. No. 15/222,905 filed Jul. 28, 2016 and entitled "HYDRAULIC SLIP COMPENSATION SYSTEMS AND METHODS", which is hereby incorporated by reference in its entirety. In such embodiments, controller 130 may be configured to use the virtual control surface estimates as the control surface angles.

In various embodiments, controller 130 may also be configured to receive one or more predetermined or preset values associated with process 900, such as a predetermined minimum release threshold, for example, or a predetermined maximum integration reliability threshold. In other embodiments, such predetermined or preset values may be stored locally in memory, provided by a user (e.g., through user input provided to user interface 120), and/or otherwise made available to controller 130.

In block 904, a logic device initiates an autorelease observation cycle. For example, controller 130 may be configured to initiate an autorelease observation cycle based, at least in part, on one or more control surface angles from steering sensor/actuator 150 and/or an autopilot control surface demand from controller 130 and/or autopilot pump controller 355, such as those received in block 902, corresponding to a control surface (e.g., rudder 266 and/or actuated propulsion system 170) for mobile structure 101 that is actuated by hydraulic steering system 350.

In various embodiments, controller 130 may be configured to determine the control surface demand using any one or combination of systems and/or methods described in U.S. patent application Ser. No. 15/239,760 filed Aug. 17, 2016 and entitled "ACCELERATION CORRECTED ATTITUDE ESTIMATION SYSTEMS AND METHODS", U.S. Provisional Patent Application No. 62/099,022 filed Dec. 31, 2014 and entitled "STABILIZED DIRECTIONAL CONTROL SYSTEMS AND METHODS", U.S. Provisional Patent Application No. 62/099,016 filed Dec. 31, 2014 and entitled "ADAPTIVE TRACK KEEPING SYSTEMS AND METHODS", and/or U.S. Provisional Patent Application No. 62/099,032 filed Dec. 31, 2014 and entitled "PROACTIVE DIRECTIONAL CONTROL SYSTEMS AND METHODS", which are hereby incorporated by reference in their entirety.

In embodiments where the autopilot control surface demands correspond to pump sensor signals, such as PWM signals, motor speed signals, and/or other power or control signals corresponding to autopilot pump controller 355 and/or autopilot pump 356, for example, controller 130 may be configured to determine the autopilot control surface rate by determining a value for the pump sensor signals. For instance, a PWM signal may correspond to a positive or negative signal (e.g., a forward or reverse pump motion), and may include an amplitude, pulse width, and/or pulse rate corresponding to an autopilot control surface rate (e.g., where the rate of the pump is roughly directly proportional to the desired rate of change in orientation of the control surface). In another example, autopilot pump speed signal 612 may correspond to a measure of the motor speed of autopilot pump 356 and be provided as a function of degrees of control surface angle per second (e.g., derived from a measured tachometer feedback from autopilot pump 356, which in turn can be derived from a DC motor back emf, for example).

In embodiments where the autopilot control surface demands correspond to pump control signals (e.g., motor PWM signals 610), for example, controller 130 may be configured to initiate the autorelease observation cycle by detecting an autopilot pump drive reversal based on the pump control signals and initiating the autorelease observation cycle based, at least in part, on the detected autopilot pump drive reversal. For example, blocks 622, 624, and 630 of process 600 may be configured to detect an autopilot pump drive reversal based on motor PWM signal 610, and block 628 may be configured to initiate the autopilot autorelease cycle by issuing a reset signal to blocks 630, 640, 642, and/or 617.

In other embodiments, controller 130 may be configured to initiating the autorelease observation cycle by detecting approximately zero autopilot pump drive for a predetermined minimum period of time, based on the pump control signals, and initiating the autorelease observation cycle based, at least in part, on the detected approximately zero autopilot pump drive for the predetermined minimum period of time. For example, block 620 of process 600 may be configured to detect approximately zero autopilot pump drive for a predetermined minimum period of time based on motor PWM signal 610, and block 628 may be configured to initiate the autopilot autorelease cycle by issuing a reset signal to blocks 630, 640, 642, and/or 617.

In additional embodiments, controller 130 may be configured to initiating the autorelease observation cycle upon detecting a prior-enabled autopilot release signal. For example, block 648 of process 600 may be configured to enable autopilot release signal 670 and provide a reset signal to block 628, and block 628 may be configured to initiate the autopilot autorelease cycle by issuing a reset signal to blocks 630, 640, 642, and/or 617.

In embodiments where the autopilot control surface demands correspond to autopilot pump speeds provided by an autopilot pump controller of the hydraulic steering system (e.g., autopilot pump speed signals 612), for example, controller 130 may be configured to initiate the autorelease observation cycle by integrating the autopilot pump speed substantially over the duration of the observation cycle to determine an estimated autopilot driven control surface angle, and initiating the autorelease observation cycle upon detecting the estimated autopilot driven control surface angle is greater than a maximum integration reliability threshold. For example, integrator block 642 may be configured to integrate autopilot pump speed 612 substantially over a duration of an observation cycle to determine an estimated autopilot driven control surface angle and provide it to block 652. Block 652 may be configured to compare the estimated autopilot driven control surface angle from block 642 to detect the estimated autopilot driven control surface angle is greater than a maximum integration reliability threshold provided by block 650, and then to provide a reset signal to block 628, and block 628 may be configured to initiate the autopilot autorelease cycle by issuing a reset signal to blocks 630, 640, 642, and/or 617.

In block 406, a logic device selectively enables an autopilot release signal. For example, controller 130 may be configured to selectively enable an autopilot release signal during the autorelease observation cycle initiated in block 904 based, at least in part, on the control surface angles and/or the autopilot control surface demands corresponding to the initiated autorelease observation cycle (e.g., those angles, demands, and/or associated signals measured and/or acquired substantially during the initiated autorelease observation cycle).

In embodiments where the control surface angles comprise control surface sensor signals from a control surface sensor of the hydraulic steering system and the autopilot control surface demands comprise pump sensor signals provided by an autopilot pump controller of the hydraulic steering system, for example, controller 130 may be configured to selectively enable an autopilot release signal by determining an estimated autopilot driven control surface angle corresponding to the autorelease observation cycle based, at least in part, on the pump sensor signals, determining an actual driven control surface angle corresponding to the autorelease observation cycle based, at least in part, on the control surface sensor signals, and selectively enabling the autopilot release signal based, at least in part, on the estimated autopilot driven control surface angle and the actual driven control surface angle.

For example, block 642 of process 600 may be configured to determine an estimated autopilot driven control surface angle accumulated during an autorelease observation cycle based on autopilot pump speed signals 612, blocks 640 and 644 may be configured to determine an actual driven control surface angle accumulated during the autorelease observation cycle based on rudder reference measurements 614, and blocks 646 and 648 may be configured to selectively enable autopilot release signal 670 based, at least in part, on the estimated autopilot driven control surface angle from block 642 and the actual driven control surface angle from block 644.

In some embodiments, determining the estimated autopilot driven control surface angle corresponding to the autorelease observation cycle includes integrator block 642 integrating autopilot pump speed 612 substantially over the duration of the observation cycle (e.g., from the initialization of the observation cycle as set by the reset signal provided by block 628) to determine the estimated autopilot driven control surface angle. In further embodiments, determining the actual driven control surface angle corresponding to the autorelease observation cycle includes determining a difference between first actual control surface angle measured substantially at a beginning of the autorelease observation cycle and a second actual control surface angle measured after the beginning of the autorelease observation cycle and within the autorelease observation cycle (e.g., at block 644) to determine the actual driven control surface angle.

In various embodiments, controller 130 may be configured to selectively enable the autopilot release signal during the autorelease observation cycle by determining an estimated manual helm input (e.g., at block 646) based, at least in part, on the control surface angles and/or the autopilot control surface demands corresponding to the initiated autorelease observation cycle (e.g., at blocks 640, 642, 644 based on inputs 612 and 614, subject to reset signals provided by block 628), determining the estimated manual helm input is greater than a predetermined minimum release threshold (e.g., at block 648), and enabling autopilot release signal 670.

In some embodiments, controller 130 may be configured to provide the autopilot release signal to autopilot controller 355 and/or another device (e.g., a switch) configured to electrically decouple autopilot pump 356 and/or autopilot pump controller 355 from power and/or various pump control signals. In some embodiments, controller 130 may be configured to monitor the autopilot release signal and control itself to discontinue providing pump control signals and/or power to autopilot pump 355 accordingly.

Notably, none of the methods to determine the state variables described above require a user to actuate a standby mode button or require a user activity sensor at the helm or helm pump to determine when to enable the autopilot release signal. Moreover, none of the methods require a user to actuate a resume button or similar to determine when to disable the autopilot release signal.

Embodiments of the present disclosure can thus disable, decouple, and/or de-energize autopilot pump 356 of hydraulic steering system 350 by comparing an intended autopilot rudder rate with a measured rudder rate to disengage the autopilot pump when the helm is sufficiently disturbed by a user/operator. Such embodiments may be used to automatically release the autopilot on a mobile structure without having to manually activate autopilot standby or risking a partially activated autopilot interfering with urgent steering maneuvers.

It is contemplated that any one or combination of methods to provide autopilot release signals may be performed according to one or more operating contexts of a control loop, for example, such as a startup, learning, running, and/or other type operating context. For example, any portion of process 900 may proceed back to an initial block and proceed through the corresponding process again to retrieve updated control surface angles, autopilot control surface demands, and/or other sensor and/or control signals, as in a control loop. In one embodiment, controller 130 may be configured to enable the autopilot release signal and then proceed through multiple passes through process 900 until the various state variables allow controller 130 to disable the autopilot release signal, as described herein.

FIGS. 10-22 illustrate flow diagrams of various control loops and other operations to provide autopilot autorelease in accordance with embodiments of the disclosure. More particularly, FIGS. 10-22 illustrate variations on the types of inputs that can be used and the types of processing that can be performed to generate an autopilot release signal for hydraulic steering system 350 for mobile structure 101, as described herein, similar to the flow diagrams, control loops, processes, and blocks described in reference to FIGS. 5-6.

Figure 10:
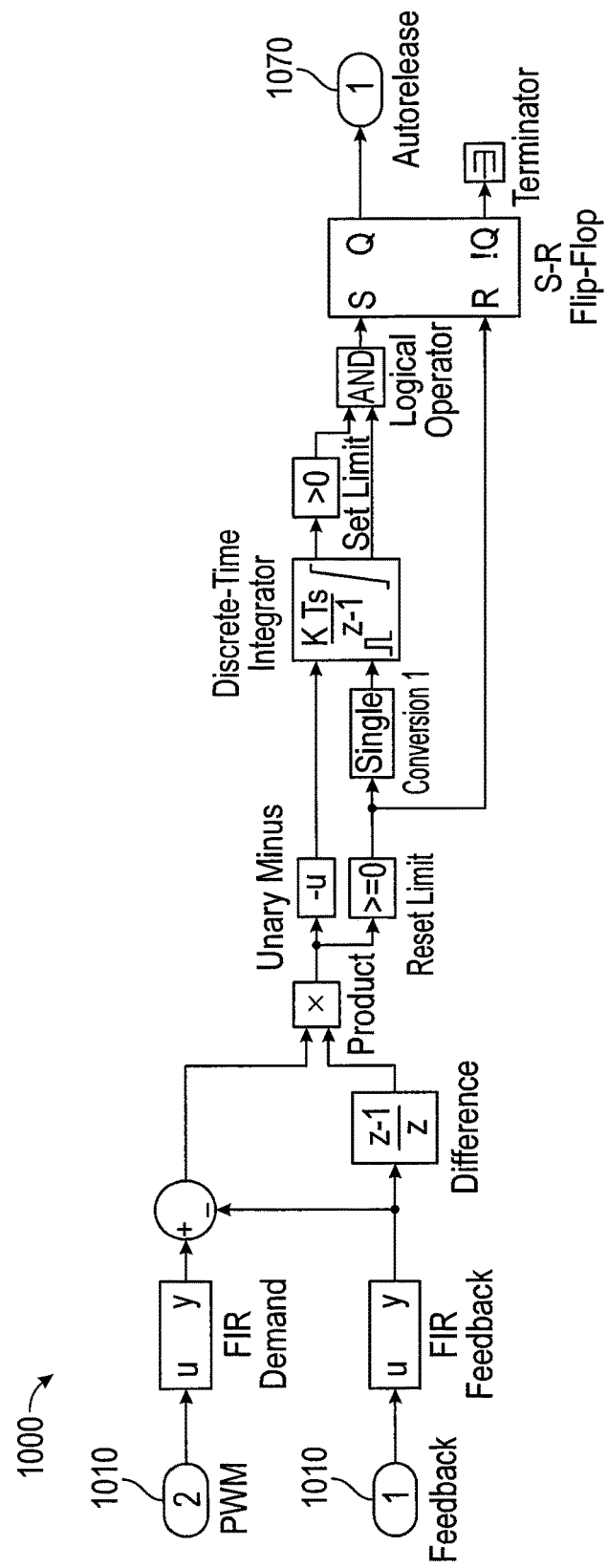
FIGS. 10-19, 20A, 20B, 21 and 22 illustrate flow diagrams of various control loops and other operations to provide autopilot autorelease in accordance with embodiments of the disclosure.
Figure 11:
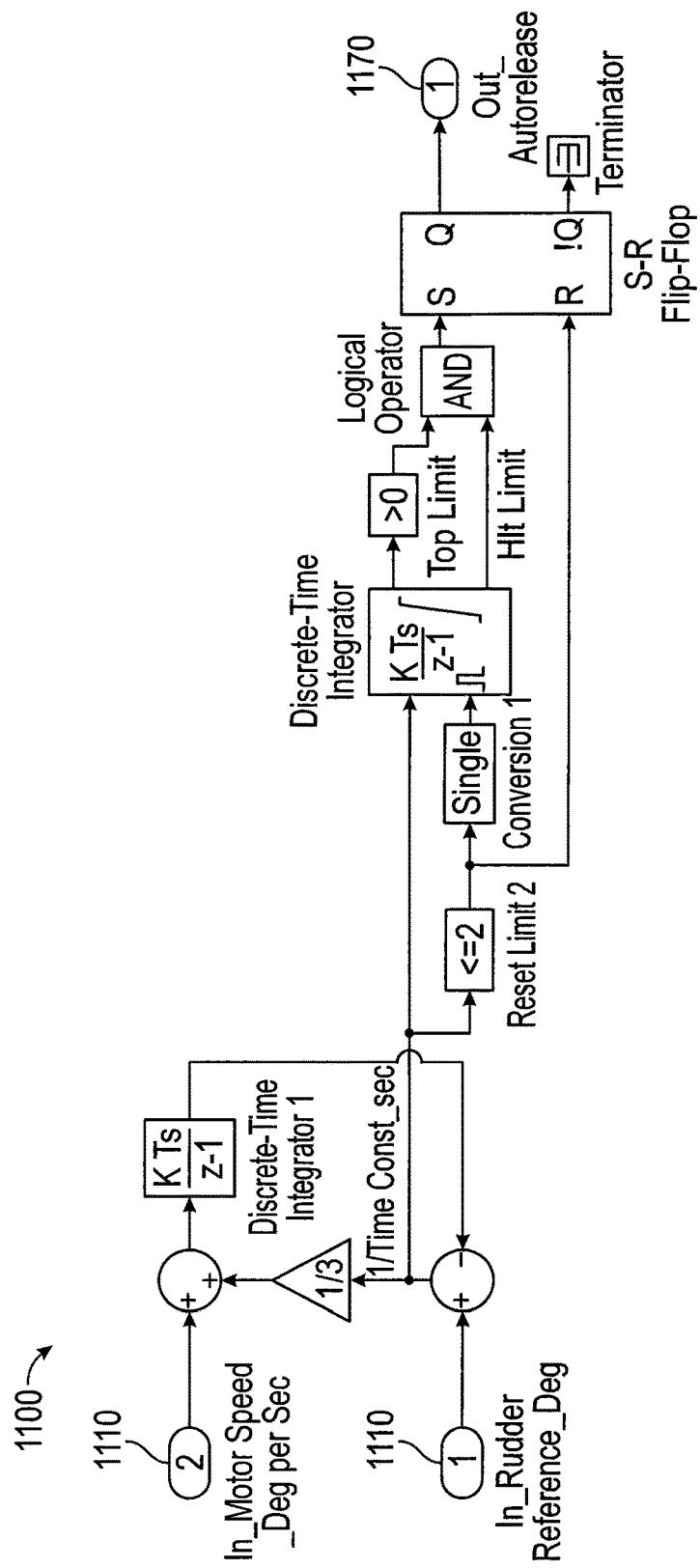
Figure 12:
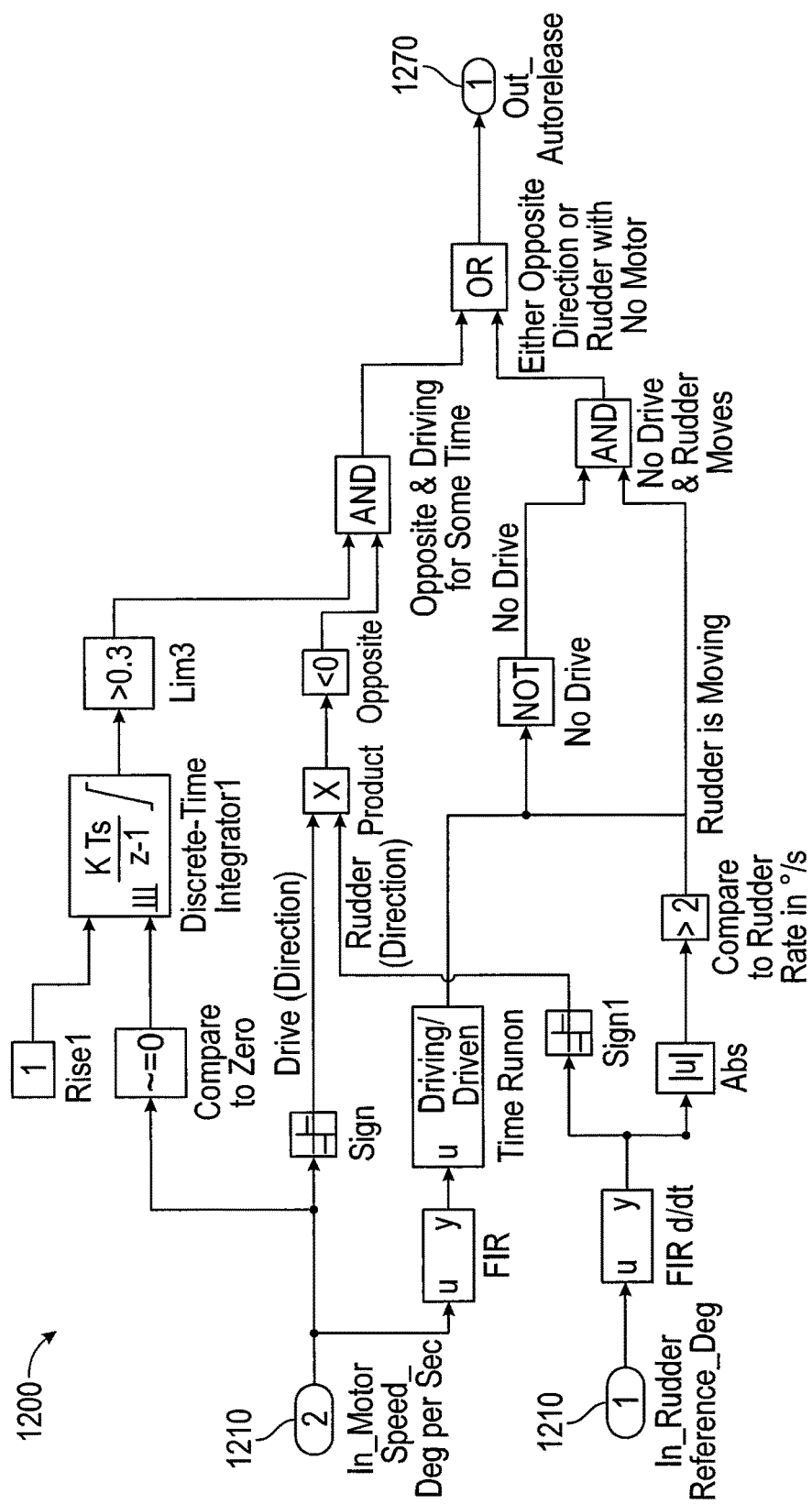
Figure 13:
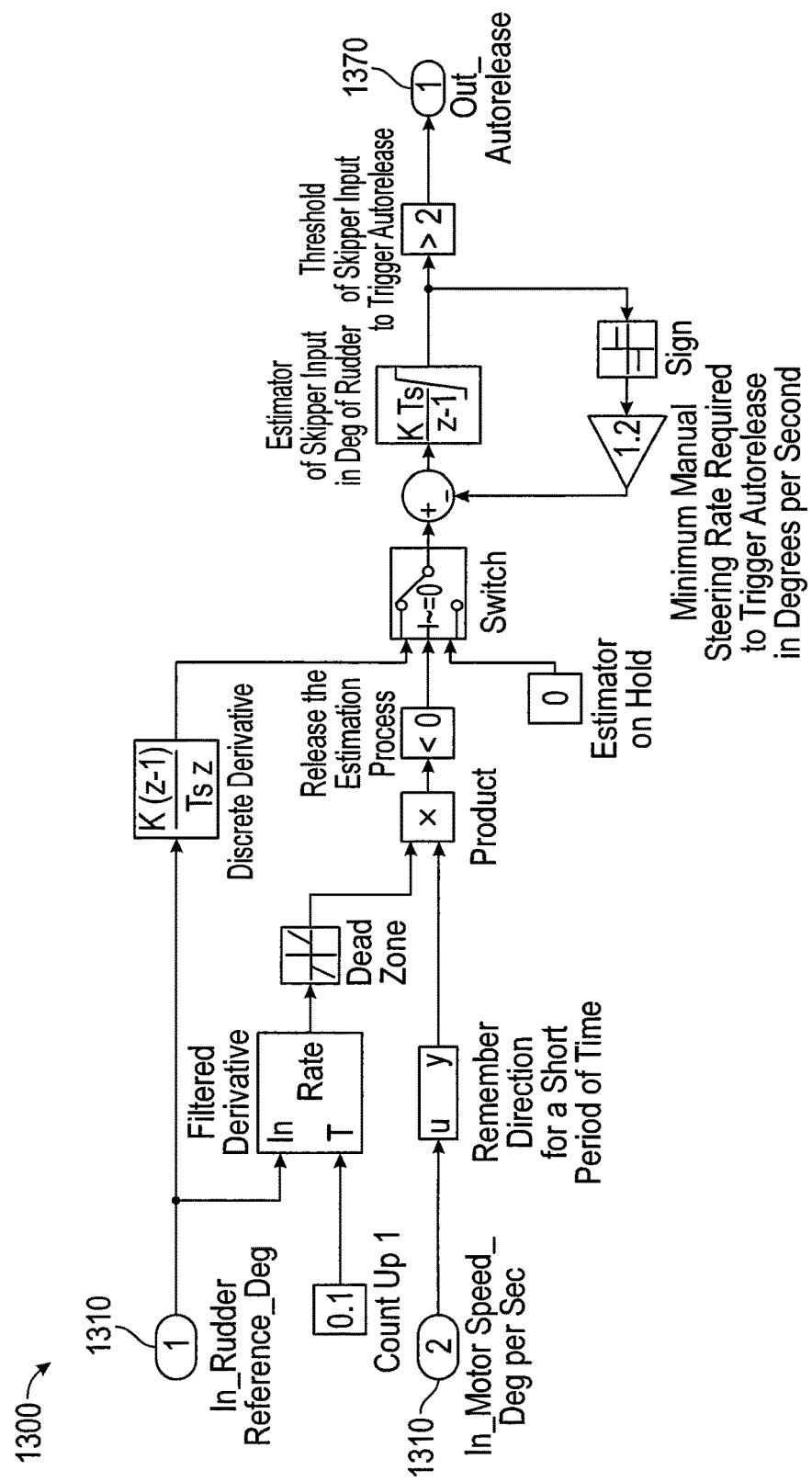
Figure 14:
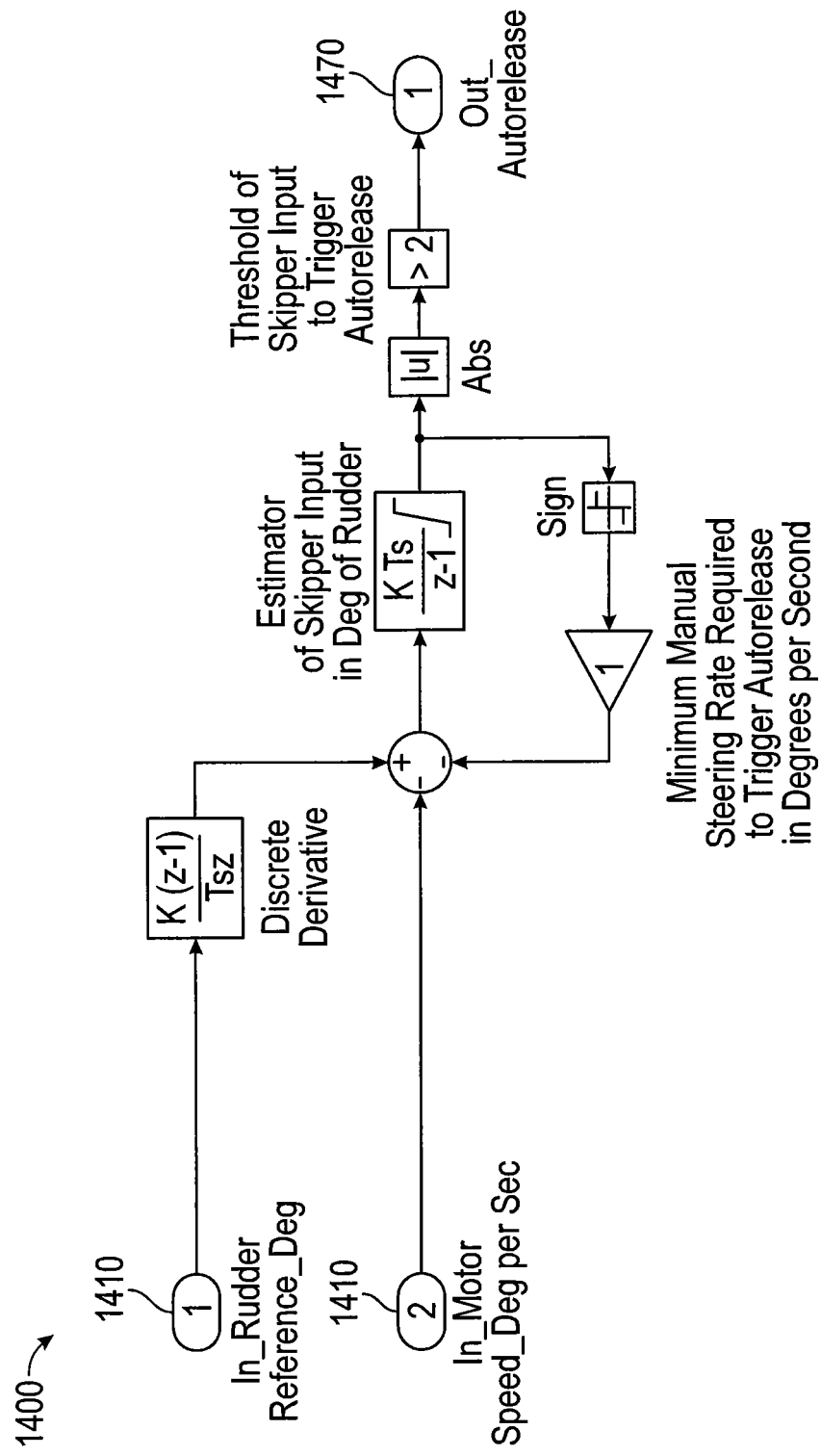
Figure 15:
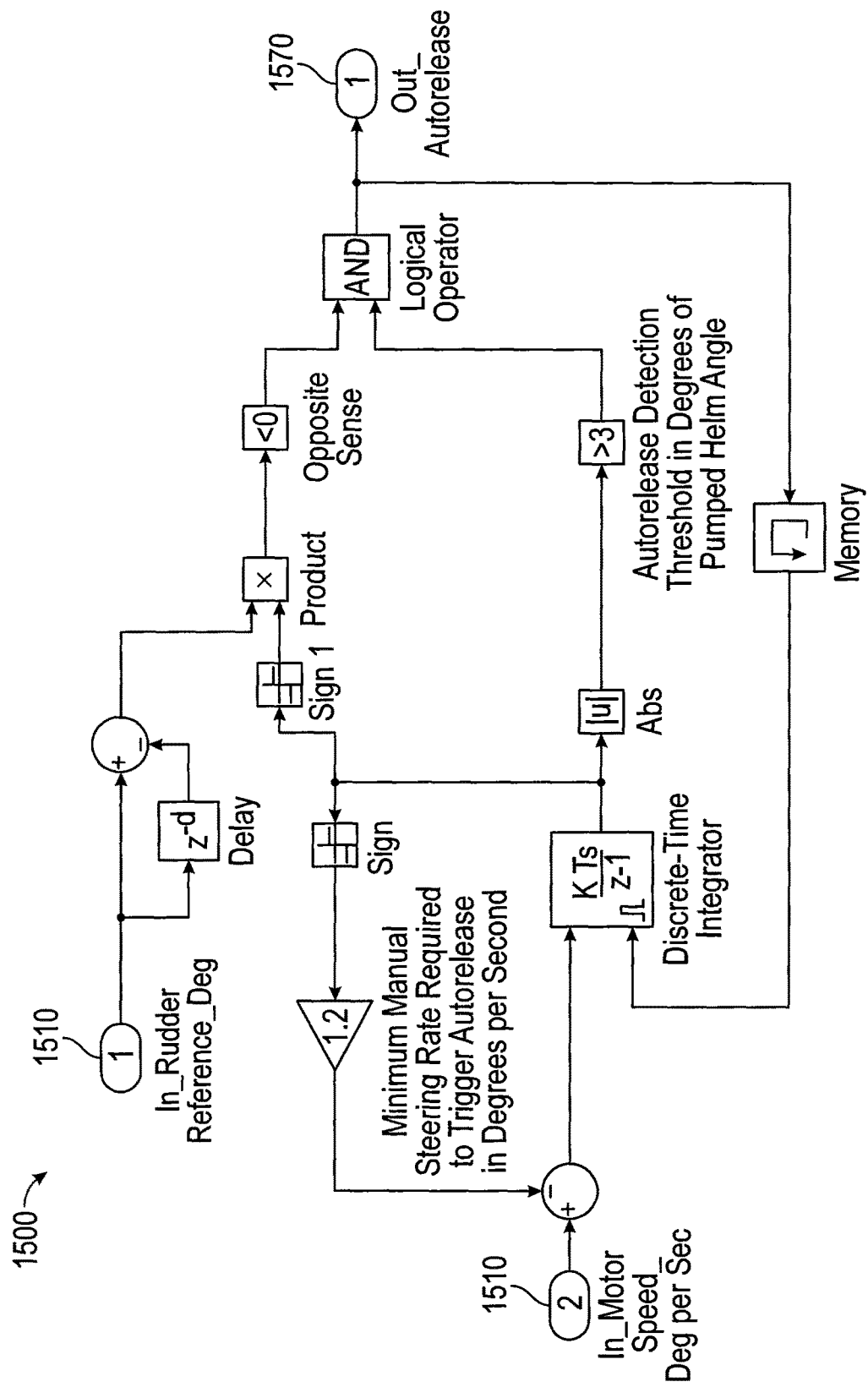

For example, process 1000 of FIG. 10 accepts inputs 1010 (e.g., a motor PWM signal and a feedback signal) and provides autopilot release signal output 1070. Process 1100 of FIG. 11 accepts inputs 1110 (e.g., an autopilot pump speed signal and a rudder reference measurement) and provides autopilot release signal output 1170. Process 1200 of FIG. 12 accepts inputs 1210 (e.g., an autopilot pump speed signal and a rudder reference measurement) and provides autopilot release signal output 1270. Process 1300 of FIG. 13 accepts inputs 1310 (e.g., an autopilot pump speed signal and a rudder reference measurement) and provides autopilot release signal output 1370. Process 1400 of FIG. 14 accepts inputs 1410 (e.g., an autopilot pump speed signal and a rudder reference measurement) and provides autopilot release signal output 1470. Process 1500 of FIG. 15 accepts inputs 1510 (e.g., an autopilot pump speed signal and a rudder reference measurement) and provides autopilot release signal output 1570.

Figure 16:
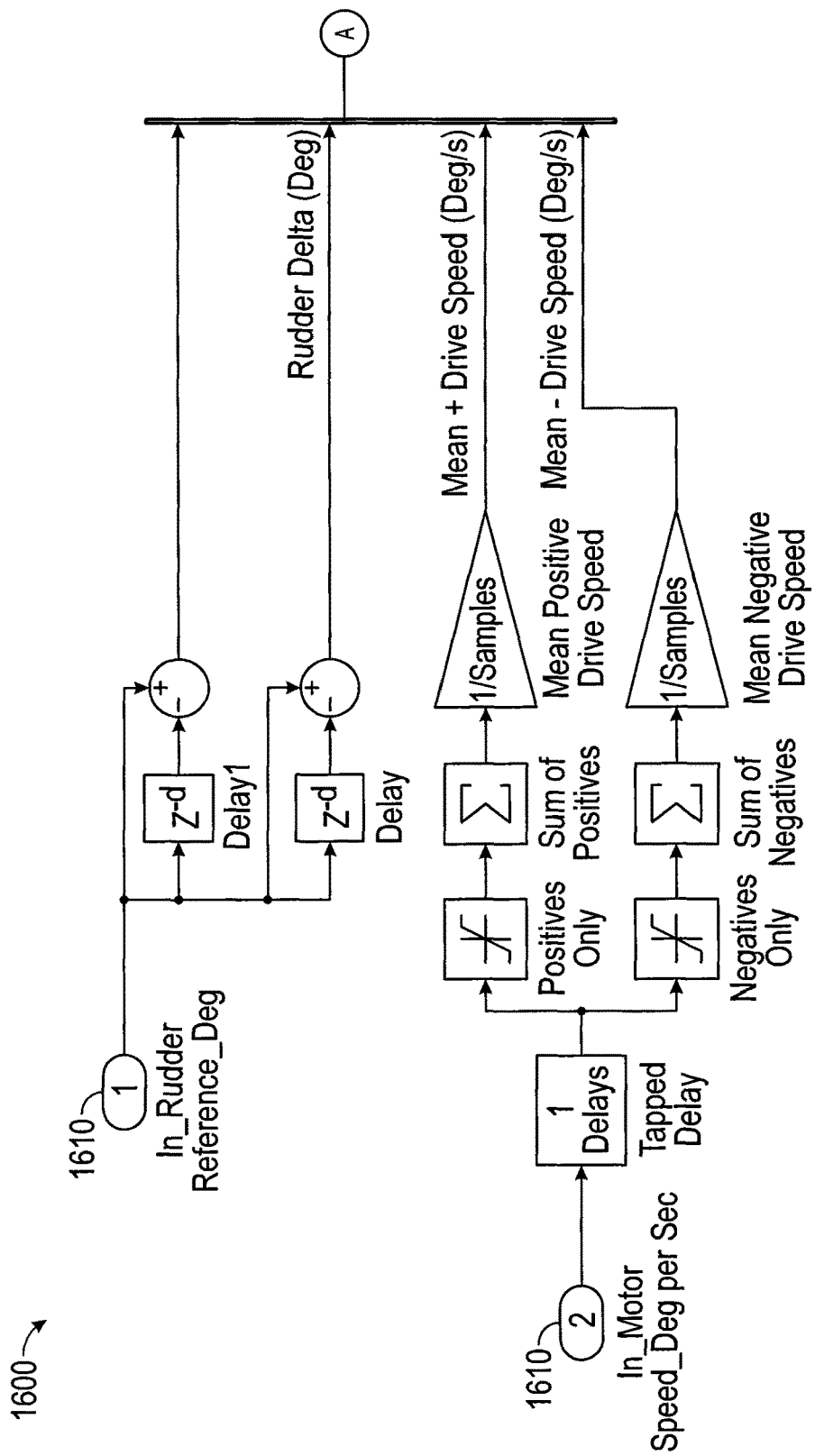
Figure 16:
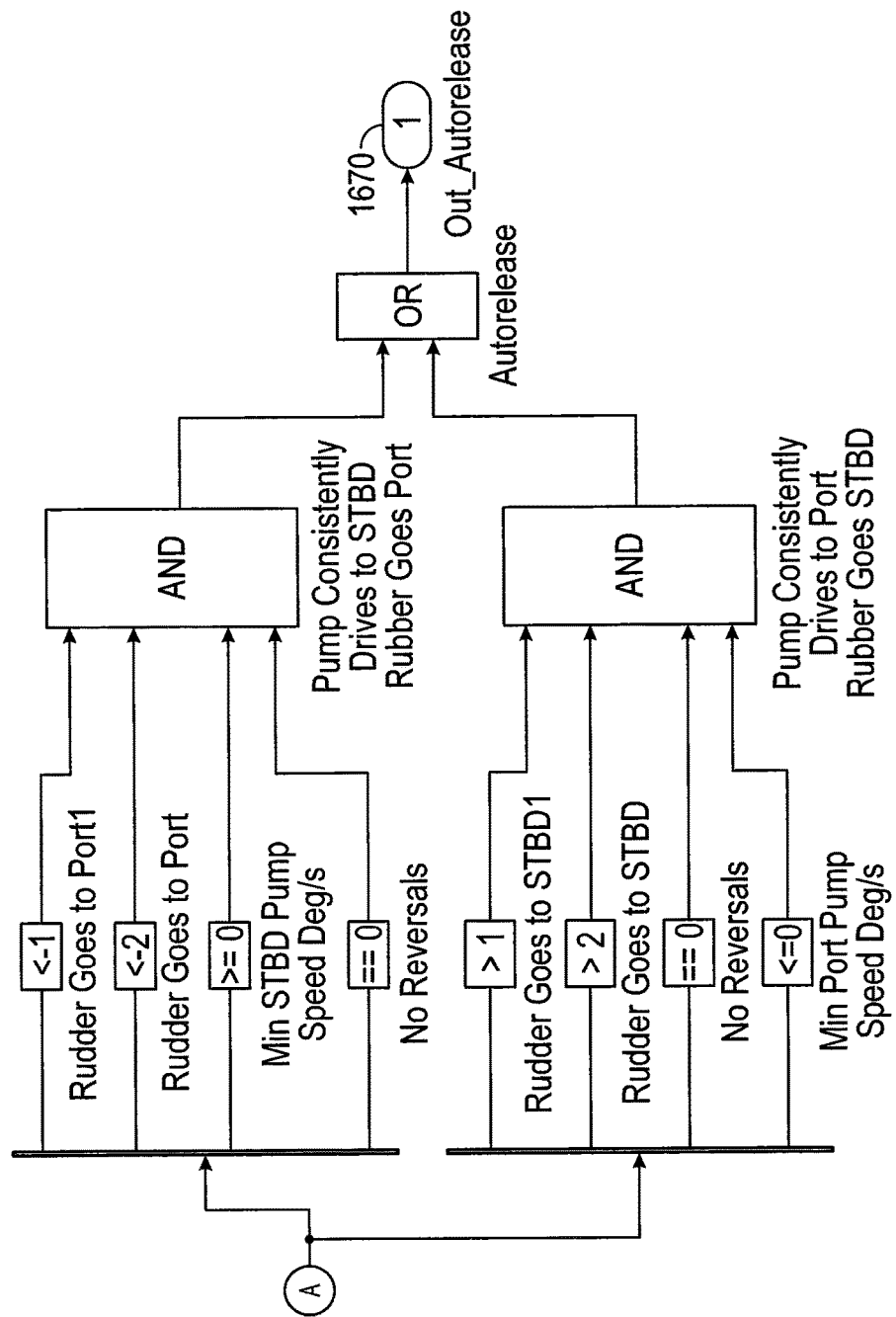
Figure 17:
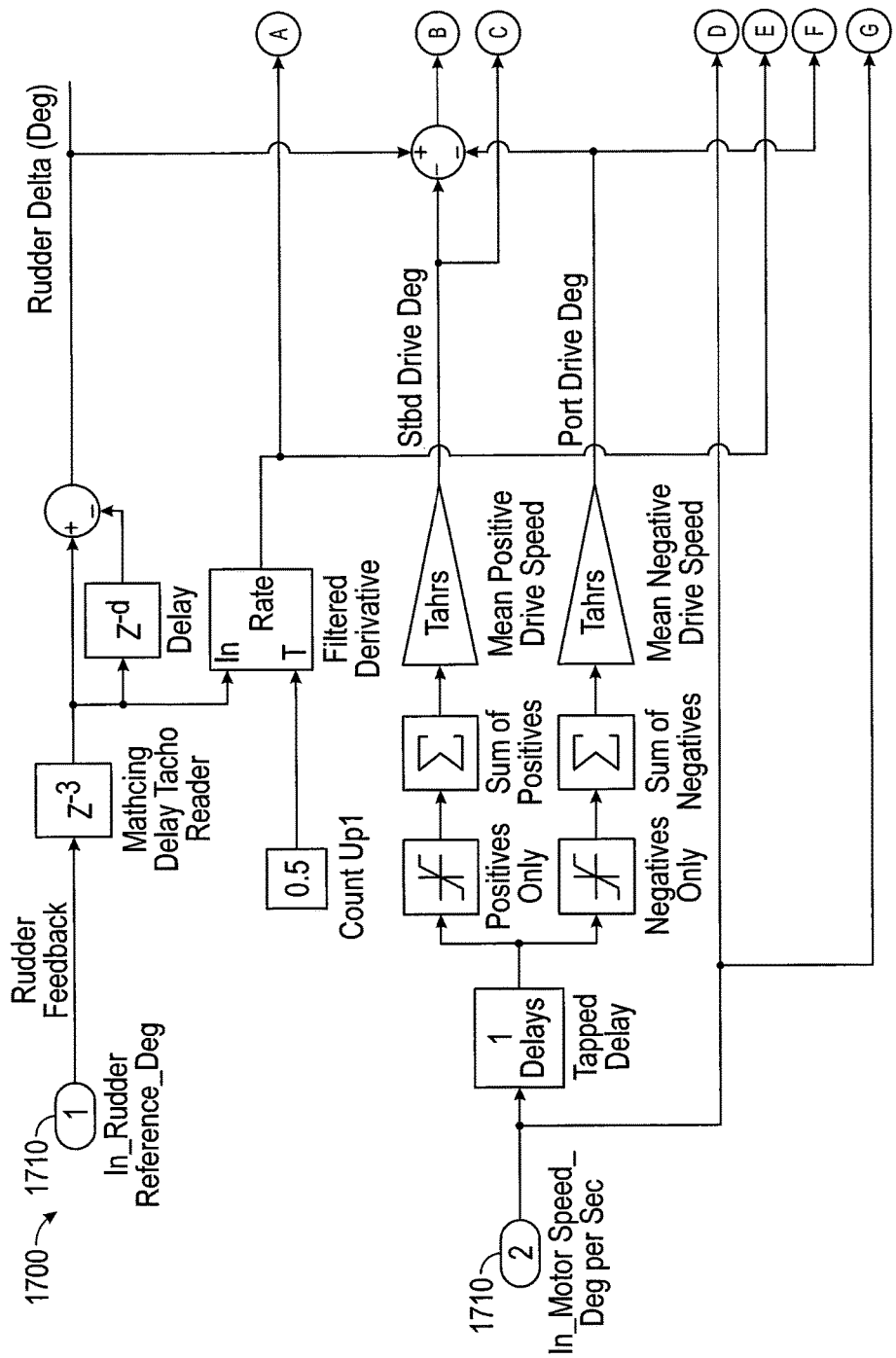
Figure 17:
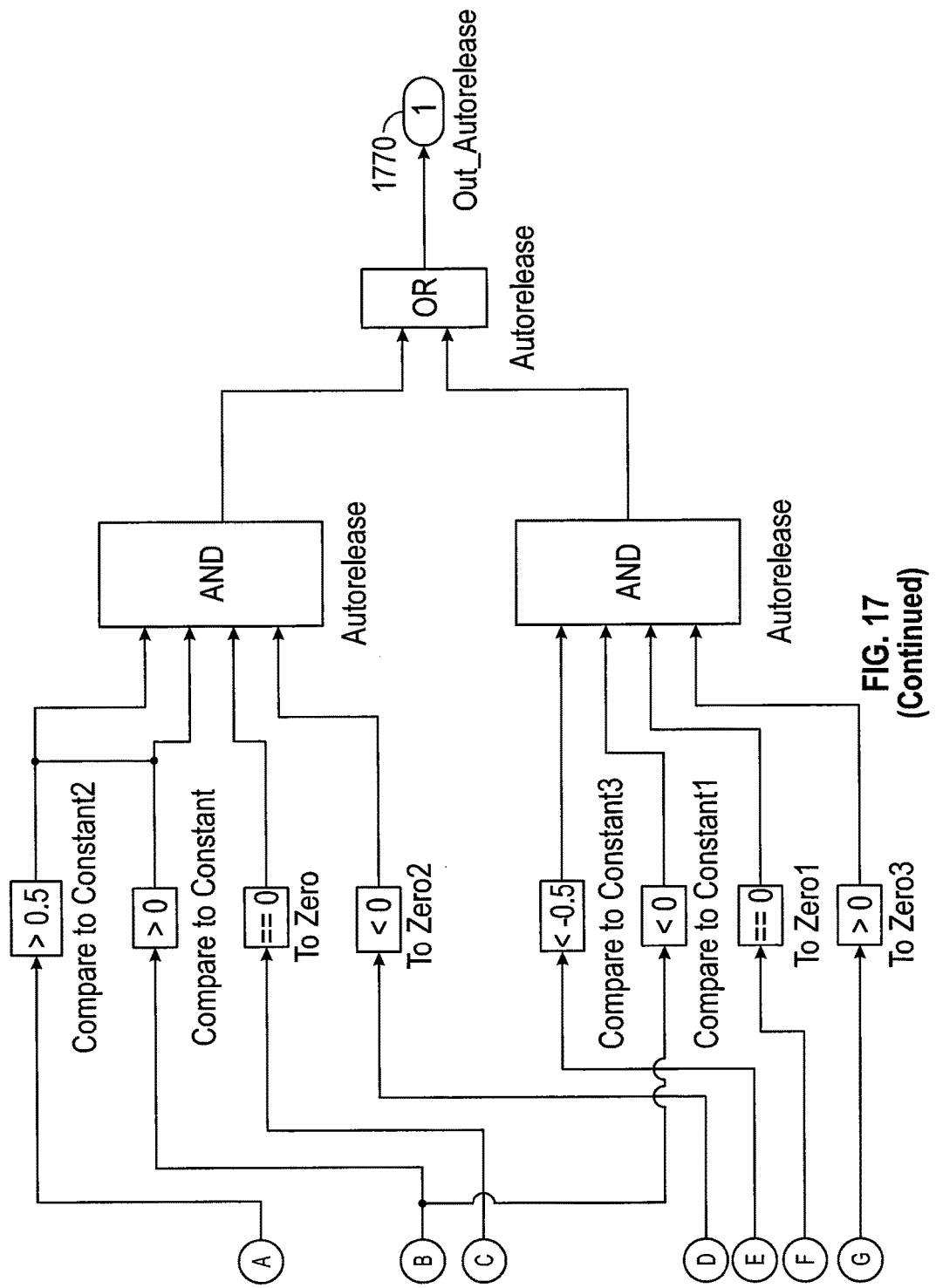
Figure 18:
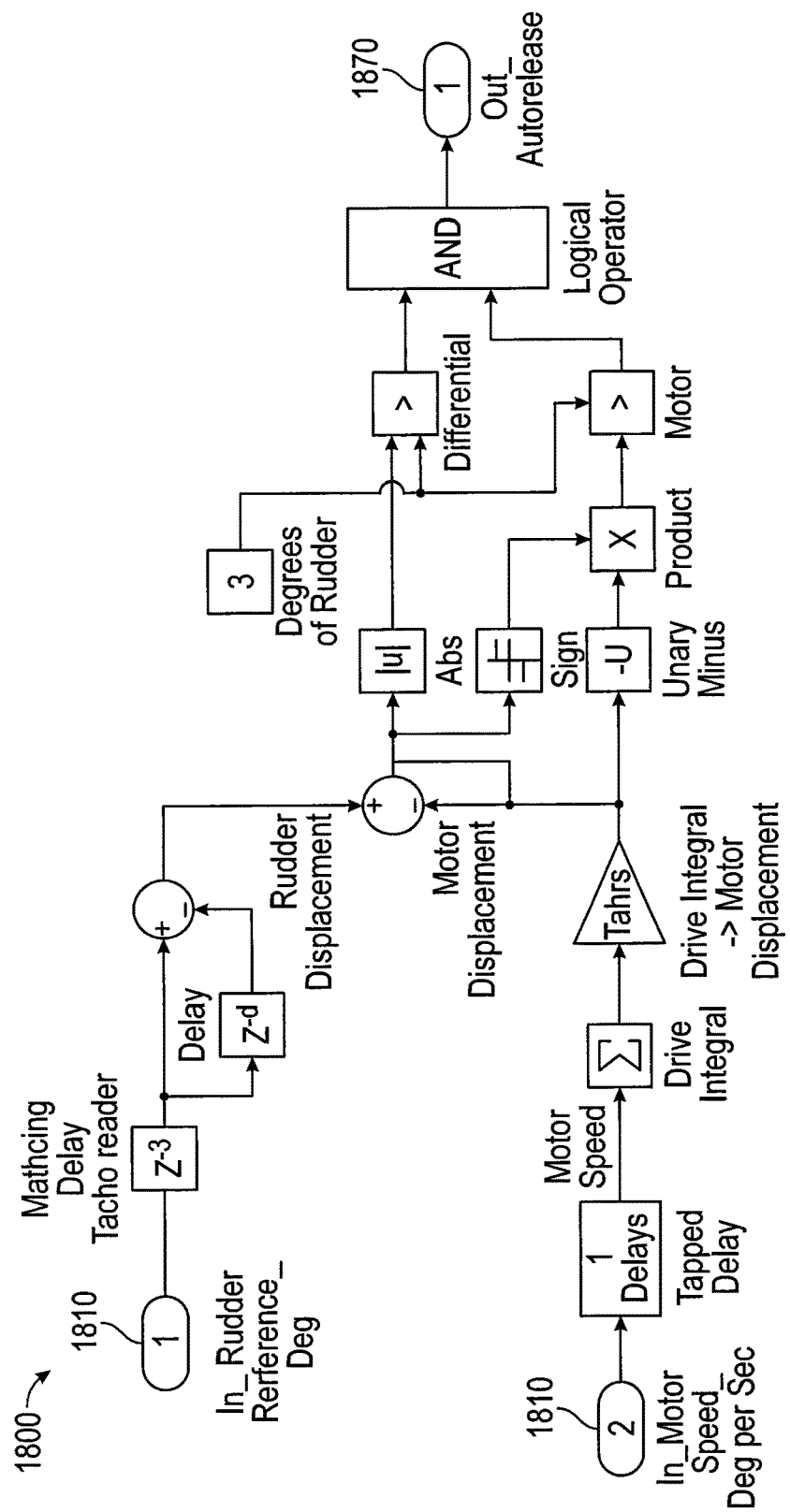
Figure 19:
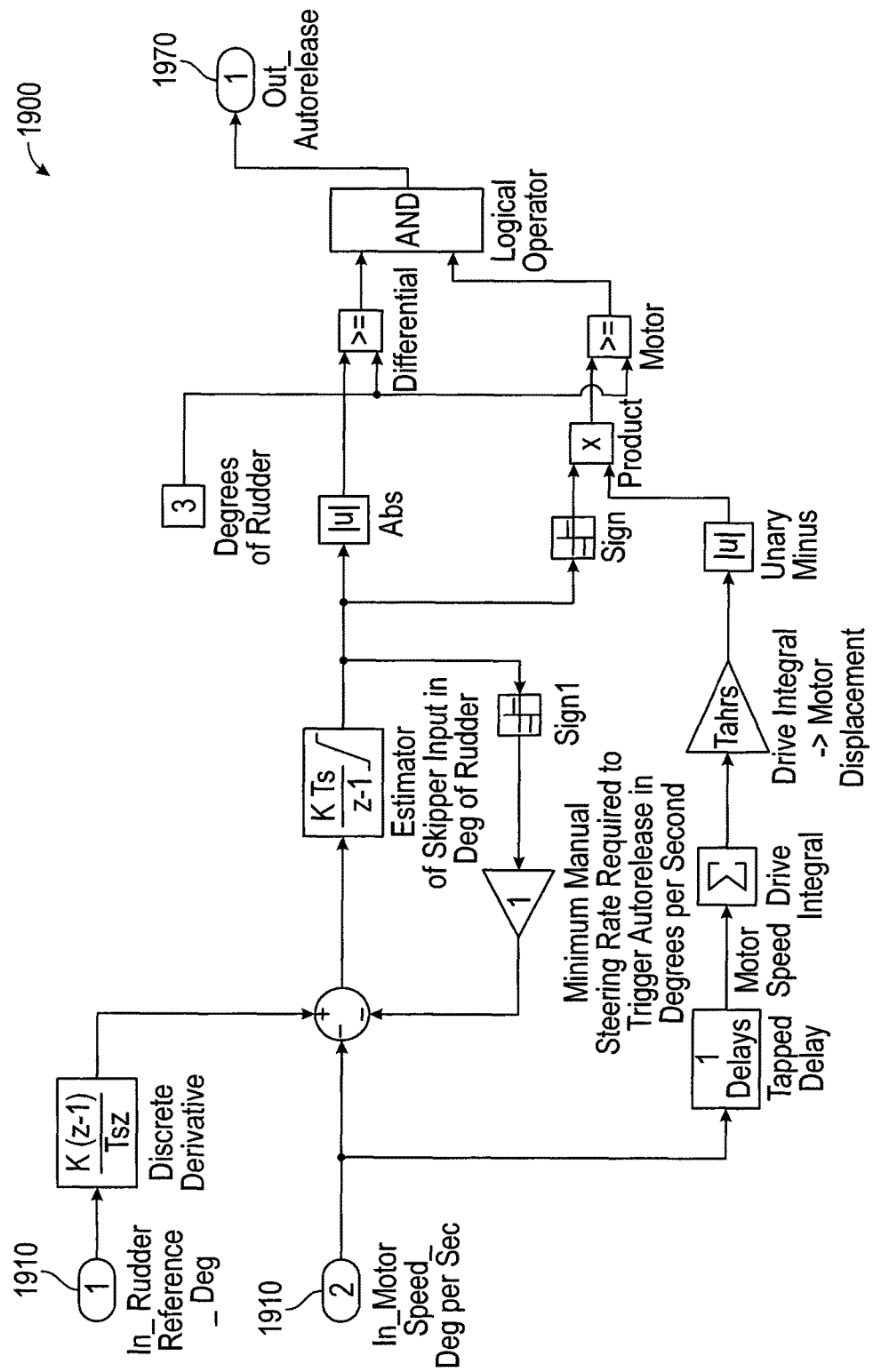

Process 1600 of FIG. 16 accepts inputs 1610 (e.g., an autopilot pump speed signal and a rudder reference measurement) and provides autopilot release signal output 1670. Process 1700 of FIG. 17 accepts inputs 1710 (e.g., an autopilot pump speed signal and a rudder reference measurement) and provides autopilot release signal output 1770. Process 1800 of FIG. 18 accepts inputs 1810 (e.g., an autopilot pump speed signal and a rudder reference measurement) and provides autopilot release signal output 1870. Process 1900 of FIG. 19 accepts inputs 1910 (e.g., an autopilot pump speed signal and a rudder reference measurement) and provides autopilot release signal output 1970.

Figure 20A:
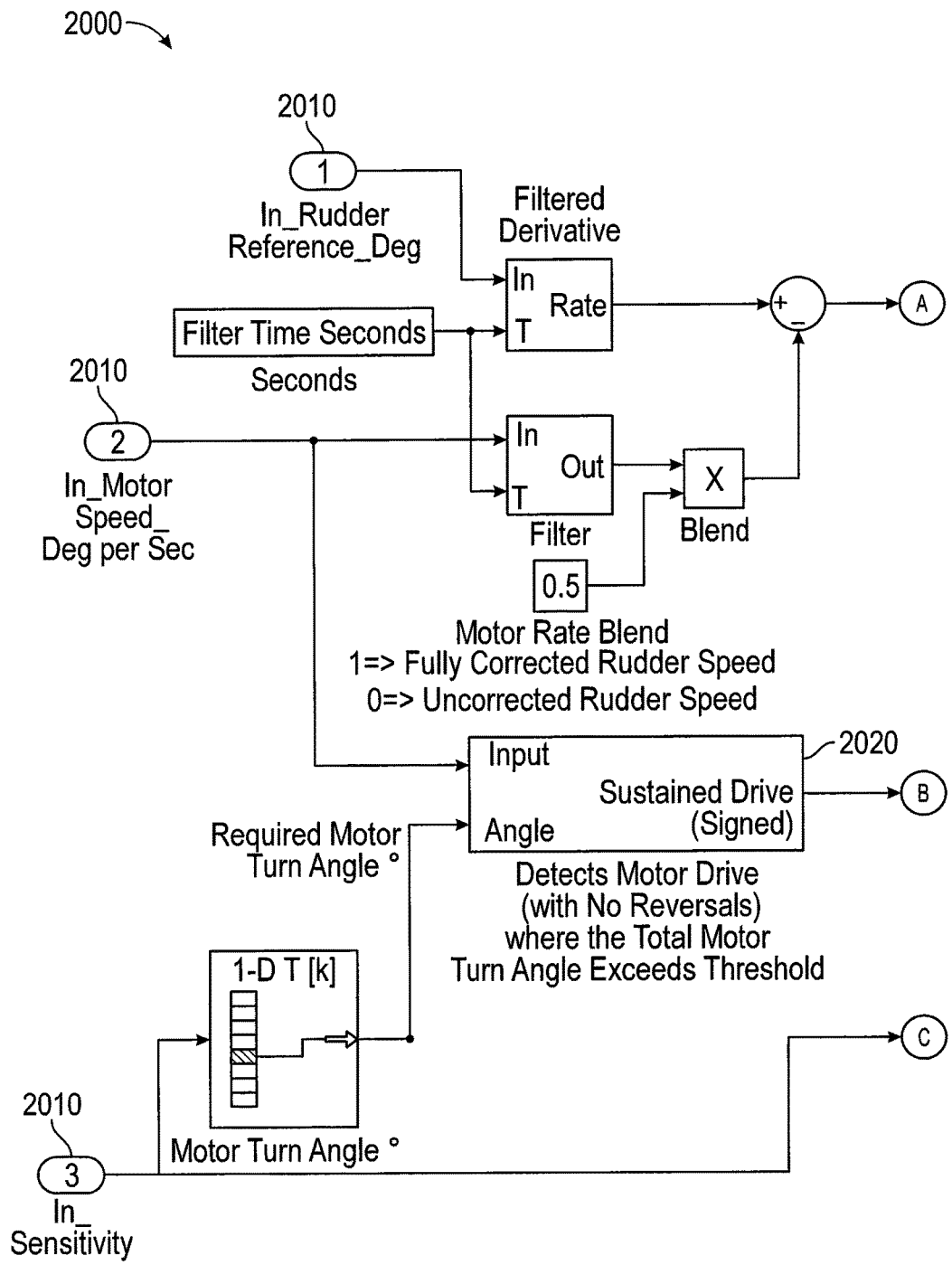
Figure 20A:
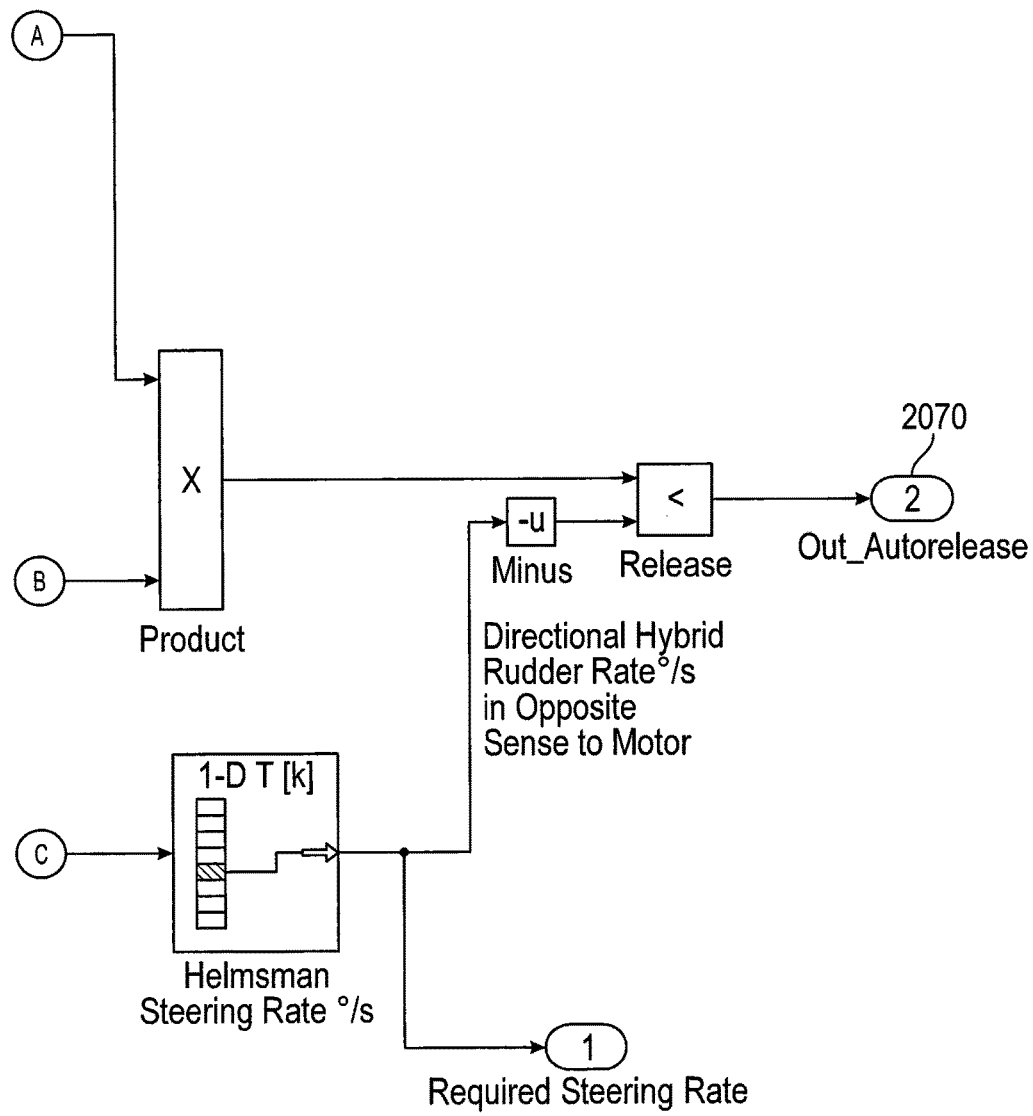
Figure 20B:
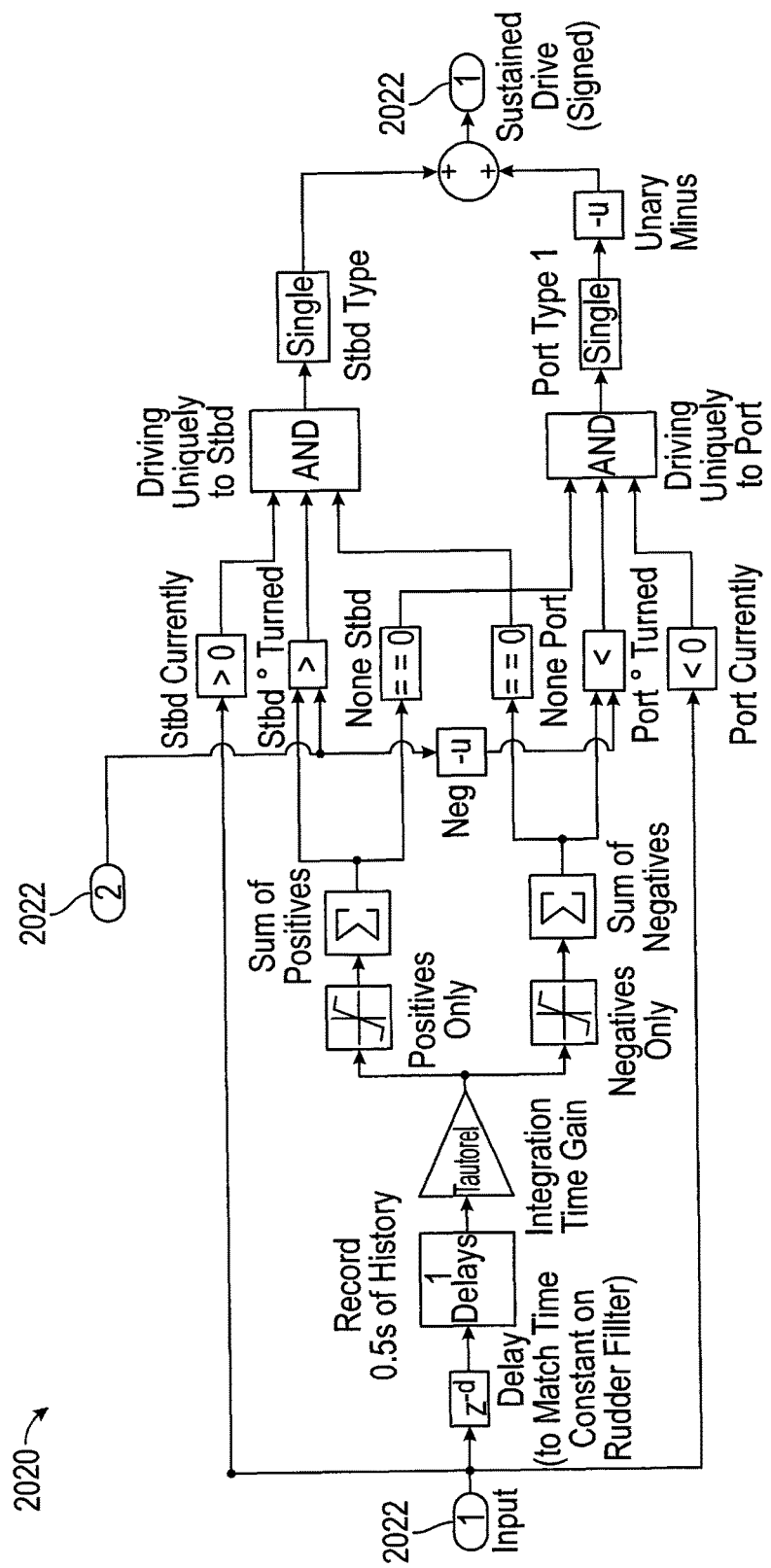

Process 2000 of FIG. 20A accepts inputs 2010 (e.g., an autopilot pump speed signal, a rudder reference measurement, and a sensitivity setting) and provides autopilot release signal output 2070. In some embodiments, process 2000 may also be configured to provide a required steering rate output as feedback from process 2000. Block 2020 of process 2000 is detailed in FIG. 20B and accepts inputs 2022 (e.g., an angle input and a motor input, which may be a motor PWM signal or an autopilot pump speed signal, for example) and provides output 2022 (e.g., a sustained drive signal).

Figure 21:
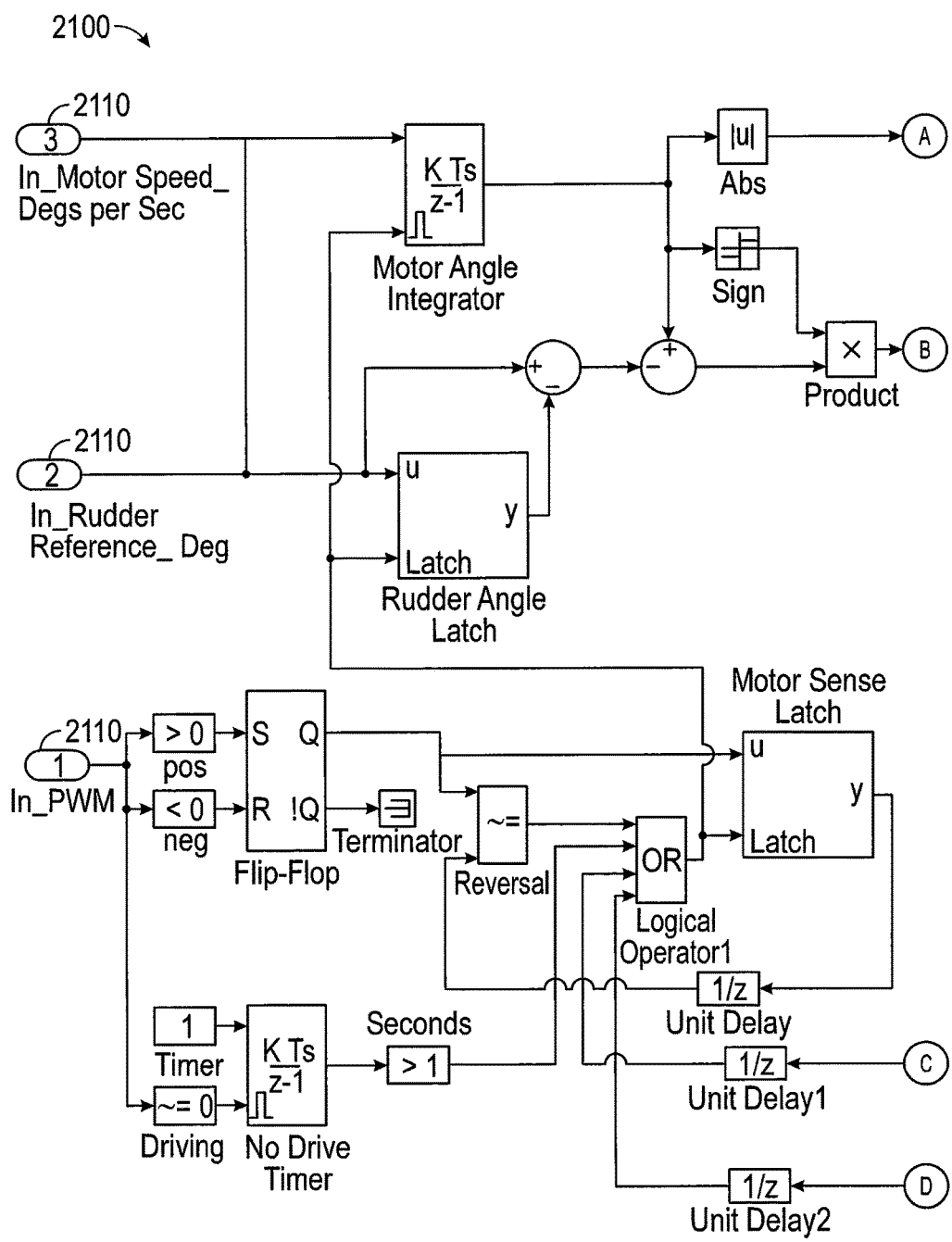
Figure 21:
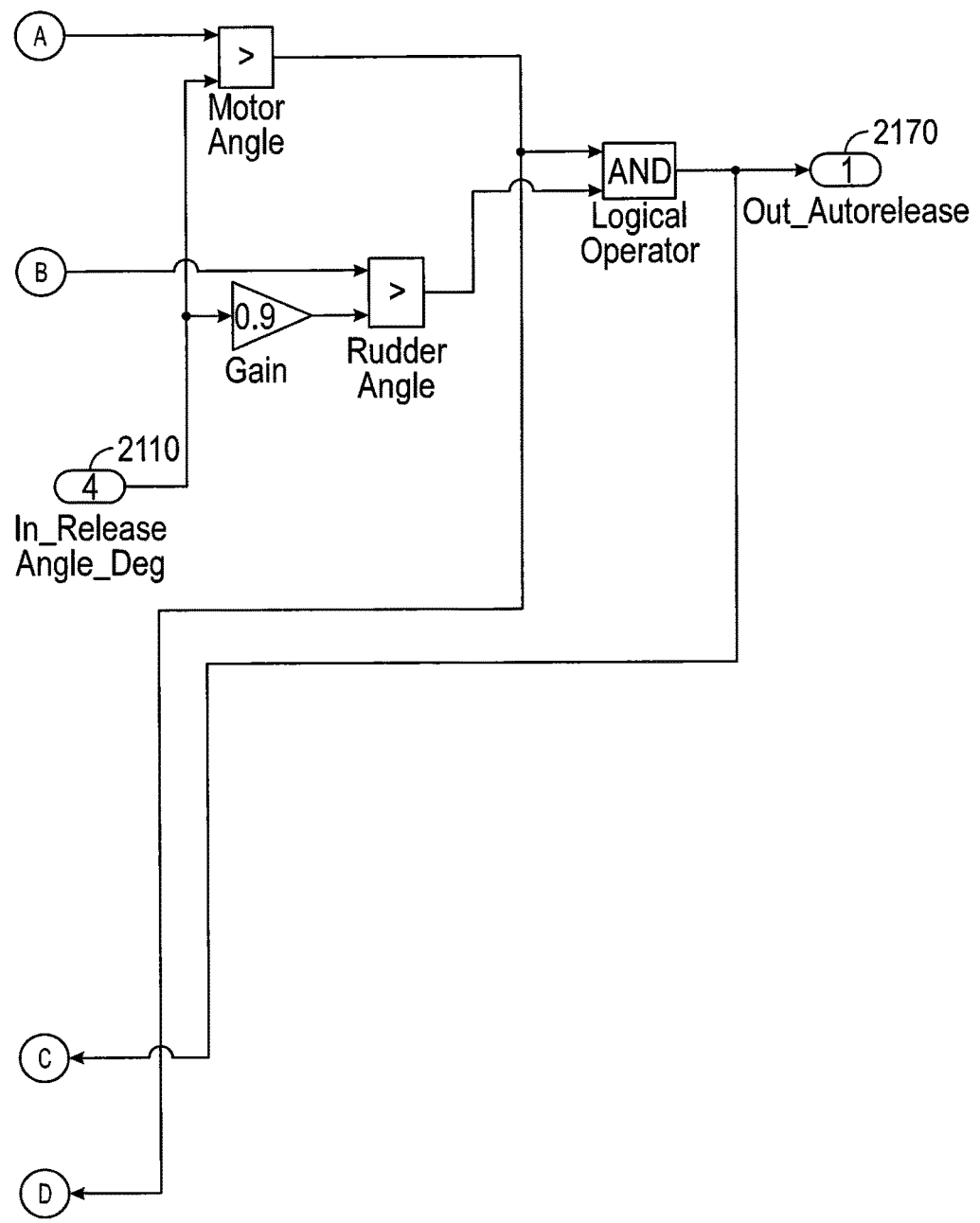
Figure 22:
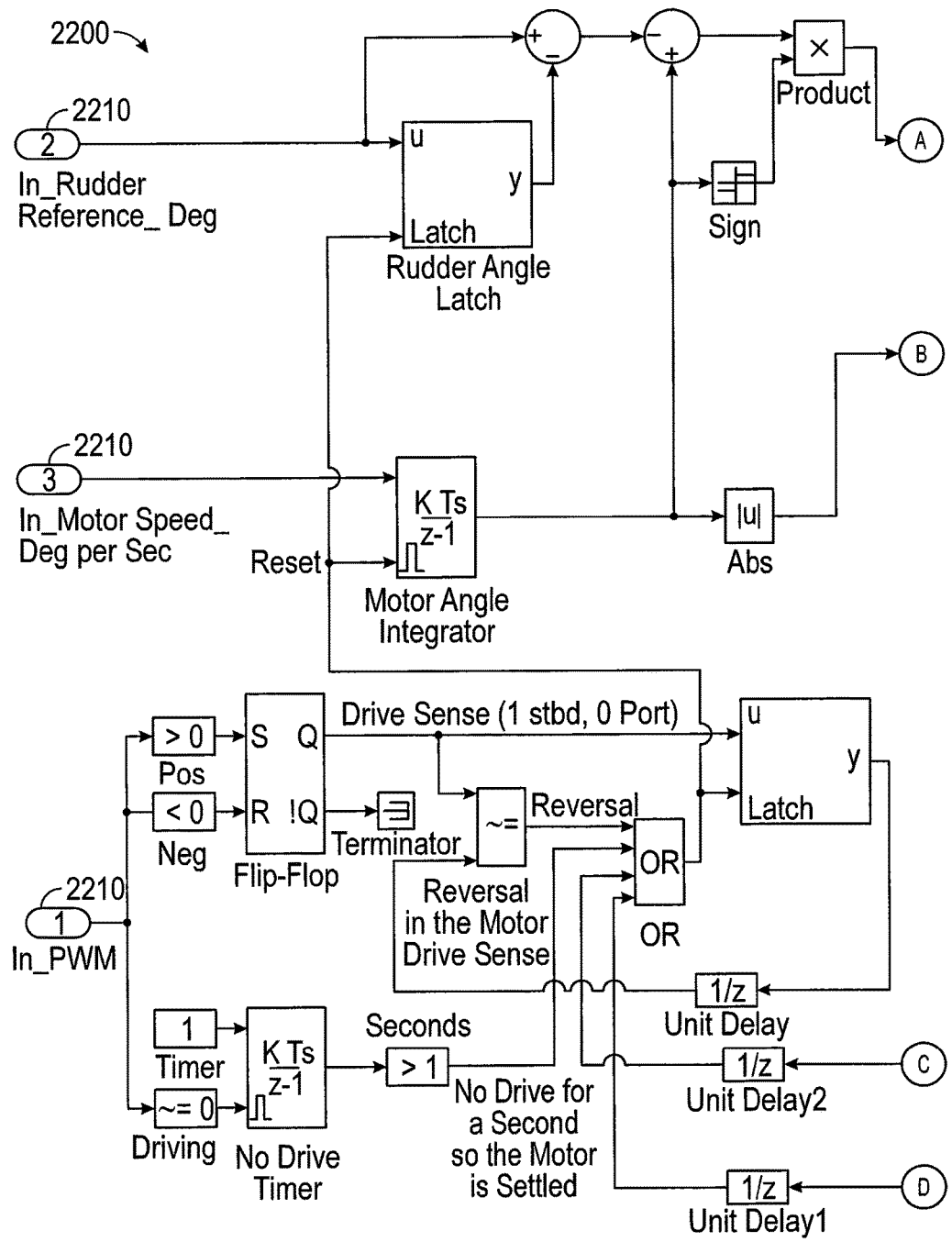
Figure 22:
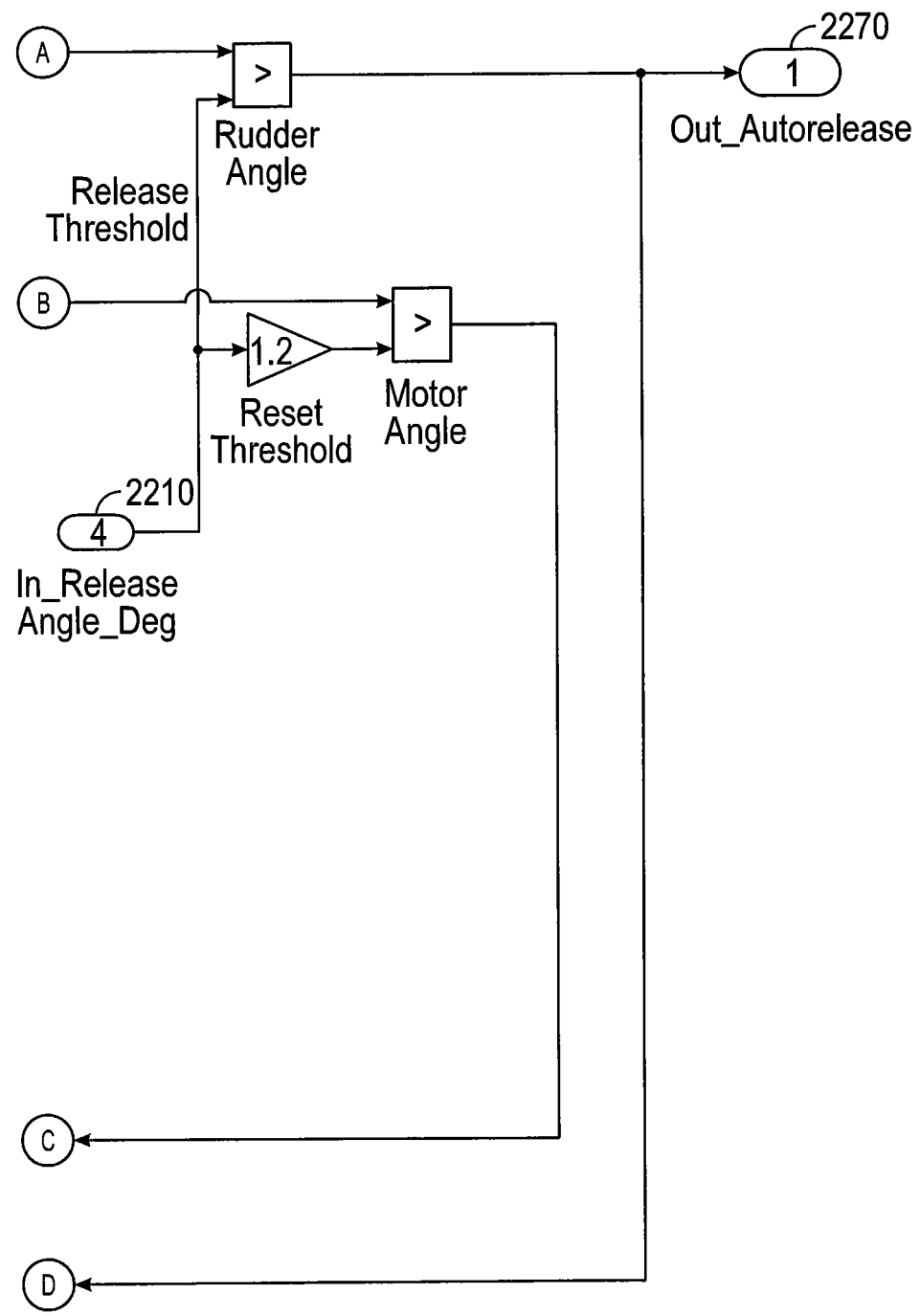

Process 2100 of FIG. 21 accepts inputs 2110 (e.g., a motor PWM signal, an autopilot pump speed signal, a rudder reference measurement, and a minimum release threshold) and provides autopilot release signal output 2170. Process 2200 of FIG. 22 accepts inputs 2210 (e.g., a motor PWM signal, an autopilot pump speed signal, a rudder reference measurement, and a minimum release threshold) and provides autopilot release signal output 2270.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A method comprising:
  receiving control surface angles and autopilot control surface demands corresponding to a control surface for a mobile structure that is actuated by a hydraulic steering system;
  receiving an angular velocity of the mobile structure corresponding to a direction of motion for the mobile structure generated by the control surface; and
  selectively disabling an autopilot of the mobile structure by selectively enabling the autopilot release signal based, at least in part, on the angular velocity and the control surface angles and/or the autopilot control surface demands.

2. A method comprising:
  receiving control surface angles and autopilot control surface demands corresponding to a control surface for a mobile structure that is actuated by a hydraulic steering system;
  initiating an autorelease observation cycle based, at least in part, on the control surface angles and the autopilot control surface demands; and
  selectively disabling an autopilot of the mobile structure by selectively enabling the autopilot release signal during the autorelease observation cycle based, at least in part, on the control surface angles and/or the autopilot control surface demands corresponding to the initiated autorelease observation cycle.

3. The method of claim 1, comprising:
  initiating an autorelease observation cycle based, at least in part, on the control surface angles and the autopilot control surface demands; and
  selectively enabling the autopilot release signal during the autorelease observation cycle based, at least in part, on the control surface angles and/or the autopilot control surface demands corresponding to the initiated autorelease observation cycle.

4. The method of claim 3, wherein the autopilot control surface demands comprise pump control signals provided to an autopilot pump controller of the hydraulic steering system, and wherein the initiating the autorelease observation cycle comprises:
  detecting an autopilot pump drive reversal or approximately zero autopilot pump drive for a predetermined minimum period of time, based on the pump control signals; and
  initiating the autorelease observation cycle based, at least in part, on the detected autopilot pump drive reversal, the detected approximately zero autopilot pump drive for the predetermined minimum period of time, or upon detecting a prior-enabled autopilot release signal.

5. The method of claim 3, wherein:
  the control surface angles comprise control surface sensor signals from a control surface sensor of the hydraulic steering system and the autopilot control surface demands comprise pump sensor signals provided by an autopilot pump controller of the hydraulic steering system; and
  the method further comprises:
    determining an estimated autopilot driven control surface angle corresponding to the autorelease observation cycle based, at least in part, on the pump sensor signals;
    determining an actual driven control surface angle corresponding to the autorelease observation cycle based, at least in part, on the control surface sensor signals; and
    selectively enabling the autopilot release signal based, at least in part, on the estimated autopilot driven control surface angle and the actual driven control surface angle.

6. The method of claim 5, wherein the pump sensor signals comprise an autopilot pump speed, and wherein the determining the estimated autopilot driven control surface angle corresponding to the autorelease observation cycle comprises:
  integrating the autopilot pump speed substantially over the duration of the observation cycle to determine the estimated autopilot driven control surface angle.

7. The method of claim 5, wherein the control surface sensor signals comprise actual control surface angles, and wherein the determining the actual driven control surface angle corresponding to the autorelease observation cycle comprises:
  determining a difference between first actual control surface angle measured substantially at a beginning of the autorelease observation cycle and a second actual control surface angle measured after the beginning of the autorelease observation cycle and within the autorelease observation cycle to determine the actual driven control surface angle.

8. The method of claim 3, wherein the selectively enabling the autopilot release signal during the autorelease observation cycle comprises:
  determining an estimated manual helm input based, at least in part, on the control surface angles and/or the autopilot control surface demands corresponding to the initiated autorelease observation cycle;
  determining the estimated manual helm input is greater than a predetermined minimum release threshold; and
  enabling the autopilot release signal.

9. The method of claim 3, wherein the autopilot control surface demands comprise an autopilot pump speed provided by an autopilot pump controller of the hydraulic steering system, and wherein the initiating the autorelease observation cycle comprises:
  integrating the autopilot pump speed substantially over the duration of the observation cycle to determine an estimated autopilot driven control surface angle; and
  initiating the autorelease observation cycle upon detecting the estimated autopilot driven control surface angle is greater than a predetermined maximum integration reliability threshold.

10. The method of claim 1, wherein:
  the mobile structure comprises a watercraft;
  the control surface comprises a rudder and/or an actuated propulsion system for the mobile structure that is actuated by an autopilot pump; and
  the autopilot release signal is configured to control a logic device and/or an autopilot pump controller to discontinue providing pump control signals and/or power to the autopilot pump.

11. A system comprising:
  a logic device configured to receive one or more sensor and/or control signals and provide an autopilot release signal for a hydraulic steering system coupled to a mobile structure, wherein the logic device is configured to:
    receive control surface angles and autopilot control surface demands corresponding to a control surface for the mobile structure that is actuated by the hydraulic steering system;
    receive an angular velocity of the mobile structure corresponding to a direction of motion for the mobile structure generated by the control surface: and
    selectively disable an autopilot of the mobile structure by selectively enabling the autopilot release signal based, at least in part, on the angular velocity and the control surface angles and/or the autopilot control surface demands.

12. The system of claim 11, wherein the logic device is configured to:
  initiate an autorelease observation cycle based, at least in part, on the control surface angles and the autopilot control surface demands; and
  selectively enable the autopilot release signal during the autorelease observation cycle based, at least in part, on the control surface angles and/or the autopilot control surface demands corresponding to the initiated autorelease observation cycle.

13. The system of claim 12, wherein the autopilot control surface demands comprise pump control signals provided to an autopilot pump controller of the hydraulic steering system, and wherein the initiating the autorelease observation cycle comprises:
  detecting an autopilot pump drive reversal or approximately zero autopilot pump drive for a predetermined minimum period of time, based on the pump control signals; and
  initiating the autorelease observation cycle based, at least in part, on the detected autopilot pump drive reversal, the detected approximately zero autopilot pump drive for the predetermined minimum period of time, or upon detecting a prior-enabled autopilot release signal.

14. The system of claim 12, wherein:
  the control surface angles comprise control surface sensor signals from a control surface sensor of the hydraulic steering system and the autopilot control surface demands comprise pump sensor signals provided by an autopilot pump controller of the hydraulic steering system; and
  the logic device is configured to:
    determine an estimated autopilot driven control surface angle corresponding to the autorelease observation cycle based, at least in part, on the pump sensor signals;
    determine an actual driven control surface angle corresponding to the autorelease observation cycle based, at least in part, on the control surface sensor signals; and
    selectively enable the autopilot release signal based, at least in part, on the estimated autopilot driven control surface angle and the actual driven control surface angle.

15. The system of claim 14, wherein the pump sensor signals comprise an autopilot pump speed, and wherein the determining the estimated autopilot driven control surface angle corresponding to the autorelease observation cycle comprises:
  integrating the autopilot pump speed substantially over the duration of the observation cycle to determine the estimated autopilot driven control surface angle.

16. The system of claim 14, wherein the control surface sensor signals comprise actual control surface angles, and wherein the determining the actual driven control surface angle corresponding to the autorelease observation cycle comprises:
  determining a difference between first actual control surface angle measured substantially at a beginning of the autorelease observation cycle and a second actual control surface angle measured after the beginning of the autorelease observation cycle and within the autorelease observation cycle to determine the actual driven control surface angle.

17. The system of claim 12, wherein the selectively enabling the autopilot release signal during the autorelease observation cycle comprises:
  determining an estimated manual helm input based, at least in part, on the control surface angles and/or the autopilot control surface demands corresponding to the initiated autorelease observation cycle;
  determining the estimated manual helm input is greater than a predetermined minimum release threshold; and
  enabling the autopilot release signal.

18. The system of claim 12, wherein the autopilot control surface demands comprise an autopilot pump speed provided by an autopilot pump controller of the hydraulic steering system, and wherein the initiating the autorelease observation cycle comprises:
  integrating the autopilot pump speed substantially over the duration of the observation cycle to determine an estimated autopilot driven control surface angle; and
  initiating the autorelease observation cycle upon detecting the estimated autopilot driven control surface angle is greater than a maximum integration reliability threshold.

19. The system of claim 11, wherein:
  the mobile structure comprises a watercraft;
  the control surface comprises a rudder and/or an actuated propulsion system for the mobile structure that is actuated by an autopilot pump; and
  the autopilot release signal is configured to control the logic device and/or an autopilot pump controller to discontinue providing pump control signals and/or power to the autopilot pump.

* * * * *